(12) United States Patent
Koo

(10) Patent No.: US 9,705,802 B2
(45) Date of Patent: Jul. 11, 2017

(54) ADAPTIVE NON-REAL-TIME TRAFFIC CONTROL METHOD AND TERMINAL FOR SAME

(71) Applicant: SK TELECOM CO., LTD., Seoul (KR)

(72) Inventor: Jahon Koo, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 86 days.

(21) Appl. No.: 14/614,888

(22) Filed: Feb. 5, 2015

(65) Prior Publication Data

US 2015/0146535 A1 May 28, 2015

Related U.S. Application Data

(63) Continuation of application No. PCT/KR2013/007049, filed on Aug. 5, 2013.

(30) Foreign Application Priority Data

Aug. 8, 2012 (KR) .................. 10-2012-0086894
Aug. 20, 2012 (KR) .................. 10-2012-0090894

(51) Int. Cl.
*H04L 12/801* (2013.01)
*H04L 12/851* (2013.01)
(Continued)

(52) U.S. Cl.
CPC ......... *H04L 47/127* (2013.01); *G06Q 20/322* (2013.01); *G06Q 20/342* (2013.01);
(Continued)

(58) Field of Classification Search
CPC ....... H04L 47/127; H04L 47/25; H04L 47/20; H04L 47/24; G06Q 50/01; G06Q 30/0207;
(Continued)

(56) References Cited

U.S. PATENT DOCUMENTS

| 7,774,826 | B1* | 8/2010 | Romanek | ............ H04L 67/306 726/1 |
| 2008/0109871 | A1* | 5/2008 | Jacobs | ................. H04L 63/20 726/1 |
| 2009/0228953 | A1* | 9/2009 | Hu | ................. G06F 15/17343 726/1 |
| 2009/0287627 | A1* | 11/2009 | Van Elburg | ......... H04L 12/5695 706/47 |

(Continued)

FOREIGN PATENT DOCUMENTS

JP  2006520937 A  9/2006
KR  10200500666332 A  6/2005

(Continued)

OTHER PUBLICATIONS

International Search Report for PCT/KR2013/007049 dated Nov. 1, 2013.

*Primary Examiner* — Pao Sinkantarakorn
*Assistant Examiner* — Kabir Jahangir
(74) *Attorney, Agent, or Firm* — Hauptman Ham, LLP

(57) ABSTRACT

A terminal device includes: a signal generator to generate a traffic request signal; a policy manager to transmit a policy request signal to a policy provider, and to receive a policy answer signal corresponding to the policy request signal; a traffic transceiver to perform a download of a traffic answer signal corresponding to the traffic request signal from a content provider via a path network; a terminal network detector to detect a network status of the path network based on the policy answer signal; and a traffic control processor, at a time of the download, to determine a traffic control status based on the network status, and control the download based on the traffic control status.

17 Claims, 13 Drawing Sheets

(51) Int. Cl.
   *G06Q 20/32*     (2012.01)
   *G06Q 20/34*     (2012.01)
   *G06Q 30/02*     (2012.01)
   *G06Q 50/00*     (2012.01)
   *H04L 12/813*    (2013.01)
   *H04L 12/825*    (2013.01)
   *H04W 4/02*      (2009.01)

(52) U.S. Cl.
   CPC ......... *G06Q 30/02* (2013.01); *G06Q 30/0207*
   (2013.01); *G06Q 50/01* (2013.01); *H04L*
   *47/20* (2013.01); *H04L 47/24* (2013.01);
   *H04L 47/25* (2013.01); *H04W 4/023* (2013.01)

(58) Field of Classification Search
   CPC .... G06Q 30/02; G06Q 20/322; G06Q 20/342;
   H04W 4/023
   See application file for complete search history.

(56) References Cited

U.S. PATENT DOCUMENTS

| | | | | |
|---|---|---|---|---|
| 2011/0225294 | A1* | 9/2011 | Chase ................. | H04L 12/2602 |
| | | | | 709/224 |
| 2014/0022897 | A1* | 1/2014 | Rajagopalan ..... | H04W 28/0215 |
| | | | | 370/230 |

FOREIGN PATENT DOCUMENTS

| | | | |
|---|---|---|---|
| KR | 1020090047092 A | 5/2009 | |
| KR | 1020110076463 A | 7/2011 | |

\* cited by examiner

ADAPTIVE NON-REAL-TIME TRAFFIC CONTROL METHOD AND TERMINAL FOR SAME

CROSS-REFERENCE TO RELATED APPLICATION

The present application is a continuation of International Application No. PCT/KR2013/007049, filed Aug. 5, 2013, which is based upon and claims the benefit of priority from Korean Patent Application No. 10-2012-0086894, filed on Aug. 8, 2012 and Korean Patent Application No. 10-2012-0090894, filed on Aug. 20, 2012. The disclosures of the above-listed applications are hereby incorporated by reference herein in their entirety.

TECHNICAL FIELD

The present disclosure relates to a method and a terminal for implementing the adaptive non-real-time traffic control.

BACKGROUND

The statements in this section merely provide background information related to the present disclosure and do not constitute prior art.

A traffic transmission control method in the current mobile communication system employs transmission of traffic in a form of best effort at a network layer which is an L3 layer of terminal and server stages, in order to transmit traffic requested by a user level in real time. However, the inventor(s) has noted that in the known traffic transmission control method, a server or a terminal of a core network can hardly detect presence or absence of a load cell or traffic status of each cell.

The inventor(s) has experienced that load or traffic congestion generated at a cell degrades data transmission efficiency of a terminal, and a terminal having a transmission failure due to packet loss or the like continuously retries the transmission at the network layer which is the L3 layer, continuously causing the load or the traffic congestion at the cell. Further, the inventor(s) has experienced that when there is no traffic transmission request at the user level, the network becomes in an idleness state where the network resources are not used, causing the communication provider side to lower the network usability.

SUMMARY

According to some embodiments of the present disclosure, a terminal device includes a signal generator, a policy manager, a traffic transceiver, a network detector, and a traffic control processor. The signal generator is configured to generate a traffic request signal. The policy manager is configured to transmit a policy request signal to a policy provider, and to receive a policy answer signal corresponding to the policy request signal. The traffic transceiver is configured to perform a download of a traffic answer signal corresponding to the traffic request signal from a content provider via a path network. The terminal network detector is configured to detect a network status of the path network based on the policy answer signal. And the traffic control processor is configured, at a time of the download, to determine a traffic control status based on the network status, and control the download based on the traffic control status.

According to some embodiments of the present disclosure, the terminal device for adaptively controlling traffic, is configured to transmit a policy request signal to a policy provider; receive a policy answer signal in response to the policy request signal; perform traffic transmission and reception including downloading a traffic answer signal in response to a traffic request signal from a content provider via a path network; detect a network status of the path network based on the policy answer signal; determine whether or not to perform traffic control based on the network status during the downloading; and control the downloading based on a result of the determining.

According to some embodiments of the present disclosure, a server for controlling a policy, comprises a communicator, a device interlocker, a network detector, and a policy determiner. The communicator is configured to communicate with a terminal device via a path network, and to receive a policy request signal from the terminal device, the policy request signal including transmitter identification information on the path network. The device interlocker is configured to receive an overloaded transmitter list from a transmitter load manager. The network detector is configured to detect network status of the terminal device assigned to the path network. The policy determiner is configured to perform a function of managing a policy related to data traffic based on the detected network status, compare the transmitter identification information with the overloaded transmitter list to check whether the terminal device is located in overload area, and generate a policy answer signal including a policy determined based on a result of the checking.

DETAILED DESCRIPTION

Some embodiments of the present disclosure relates to providing an adaptive non-real-time traffic control method of transmitting traffic on a non-real-time basis when usage rate of network resources is low, thus adaptively transmitting the traffic without affecting traffic of the network, and a terminal for implementing the adaptive non-real-time traffic control method. Herein the "non-real-time" means that any device does not transmit received data immediately upon receiving, but transmit at an appropriate time in a manner to save network resources to thereby enhance the overall network efficiency.

Hereinafter, at least one embodiment of the present disclosure will be described in detail with reference to the accompanying drawings.

Figure 1:
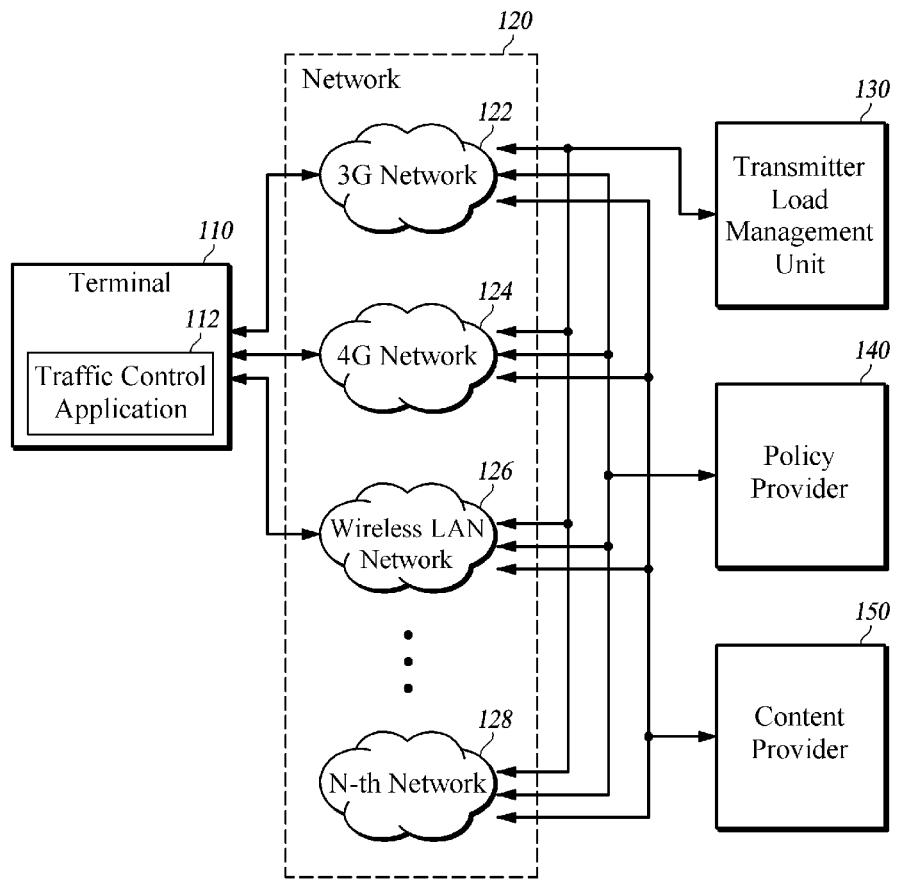
FIG. 1 is a block diagram of an adaptive non-real-time traffic control system according to at least one embodiment of the present disclosure.

FIG. 1 is a block diagram of an adaptive non-real-time traffic control system according to at least one embodiment of the present disclosure.

The adaptive non-real-time traffic control system includes a terminal 110, a traffic control application 112, a network 120, a policy provider 140, and a content provider 150. The constituent elements included in the adaptive non-real-time traffic control system are not limited to these elements. The traffic mentioned here means the amount of data flow on a transmission path of the network 120 within a predetermined time. The traffic control application 112 of the terminal is implemented by, or includes, one or more processors and/or application-specific integrated circuits (ASICs). Other components of the adaptive non-real-time traffic control system, such as each of the policy provider 140, and the content provider 150 are implemented by, or includes, one or more processors and/or application-specific integrated circuits (ASICs). Each of the policy provider 140 and the content provider 150 comprises input units such as one or more buttons, a touch screen, a mic and so on, and output units such as a display, an indicator and so on.

The terminal 110 is a device that can transmit and receive various data via the network 120 based on a key operation or an instruction from a user. The terminal 110 is a tablet PC, a laptop, a desktop PC, a smart phone, a PDA (personal digital assistant), a mobile communication terminal, or the like. The terminal 110 is a cloud computer that supports a cloud computing in which services such as read, write, and storage of data and usage of network and contents can be used via the network 120. The terminal 110 is implemented by, or includes, one or more processors and/or application-specific integrated circuits (ASICs).

The terminal 110 is an apparatus for performing a voice or data communication by using the network 120. The terminal 110 includes a memory for storing various programs or protocols for communicating with the content provider 150 via the network 120, a microprocessor for executing the programs to perform calculation and controlling, and the like. The terminal 110 can be any type of terminal so long as it provides a server-client communication with the content provider 150, which has a broad concept including all types of communication computing apparatuses such as a notebook computer, a mobile communication terminal, a PDA, and the like. The terminal 110 includes a plurality of communication modules, and performs the voice or data communication via a path network (any one of 122, 124, 126, ..., and 128) that is used as a path of a non-real-time traffic in the network 120. The terminal 110 communicates with the content provider 150 via the path network (any one of 122, 124, 126, ..., and 128). The terminal 110 stores contents in the terminal 110 for traffic processing, or manages data with which the traffic of the terminal 110 is to be transmitted to the content provider 150. The terminal 110 comprises input units such as one or more buttons, a touch screen, a mic and so on, and output units such as a display, an indicator and so on.

In the first and second embodiments, the terminal 110 is described as a separate apparatus from the policy provider 140; however, in an actual implementation of at least one embodiment, the terminal 110 can be implemented as a standalone apparatus that includes the policy provider 140.

The terminal 110 includes the traffic control application 112, and performs a non-real-time traffic control. The terminal 110 drives the traffic control application 112 by an operation or an instruction, inputted through the input units, from a user, and performs an adaptive non-real-time traffic control by using the traffic control application 112. The traffic control application 112 is described in detail. When the terminal 110 is a smart phone, the traffic control application 112 is an application that is downloaded from an application store and installed in the smart phone. When the terminal 110 is a feature phone, the traffic control application 112 is embodied as an application (e.g, software to perform this application or hardware module including this software) that is driven on a VM (virtual machine) downloaded via a communication provider server.

A mode of installing the traffic control application 112 in the terminal 110 is described. The terminal 110 is implemented in a state in which the traffic control application 112 is installed in an embedded form, installed in a form of being embedded in an OS (operating system) installed in the terminal 110, or installed in a form of being installed in the OS of the terminal 110 by an operation or an instruction from a user. The traffic control application 112 installed in the terminal 110 in the above-mentioned manner can be implemented to be interlocked with basic applications (for example, a text sending application, a voice call sending and receiving application, a data sending and receiving application, a messenger application, and the like) installed in the terminal 110, but not limited to this scheme. In other words, the traffic control application 112 can also be implemented to be separately operated without an inter-work or interlock with the basic applications.

A step in which the terminal 110 according to at least one first embodiment performs an adaptive non-real-time traffic control by using the traffic control application 112 installed therein is described below. The terminal 110 generates a non-real-time traffic request signal by an operation or an instruction, inputted through the input units, from a user. The non-real-time traffic request signal is a sort of traffic request signal. When a user inputs an instruction to request for particular contents by operating the terminal 110, the terminal 110 transmits a traffic request signal for the contents to the content provider 150. The terminal 110 controls the traffic based on a network status of the path network (any one of 122, 124, 126, ..., and 128), and when the network status is busy, this traffic request signal works as the non-real-time traffic request signal. The same concept can apply on a non-real-time traffic answer signal corresponding to the non-real-time traffic request signal.

The terminal 110 according to the at least one first embodiment transmits a policy request signal to the policy provider 140, and receives a policy answer signal corresponding to the policy request signal. The terminal 110 detects the network status of the path network (any one of 122, 124, 126, . . . , and 128) based on the policy answer signal. The terminal 110 downloads the non-real-time traffic answer signal corresponding to the non-real-time traffic request signal via the path network (any one of 122, 124, 126, . . . , and 128), or uploads the contents previously stored in the terminal 110 to the content provider 150. The terminal 110 determines whether or not to control the traffic based on the network status detected at the time of the download or the upload, and controls the download or the upload (traffic) based on a result of the determination.

When downloading the non-real-time traffic answer signal from the content provider 150, the terminal 110 according to the first embodiment causes the non-real-time traffic answer signal to be downloaded to a predetermined storage area depending on a data type of the non-real-time traffic answer signal. The terminal 110 transmits the policy request signal to the policy provider 140 based on policy request cycle information included in the policy answer signal.

A step of detecting the network status of the path network (any one of 122, 124, 126, . . . , and 128) via which the terminal 110 according to the first and second embodiments performs a communication is described below. The terminal 110 detects any one of busy status, normal status, and smooth status based on a wave condition signal received from the path network (any one of 122, 124, 126, . . . , and 128). The terminal 110 detects the network status by comparing at least one parameter among parameters of Rx, Tx, Ec/Io, RSSI, transmission rate, the number of assigned terminals, which are included in the wave condition signal, with a preset network status threshold. When a result of the comparison indicates that the value of the parameter exceeds the network status threshold, the terminal 110 detects that the network status is busy. When the result of the comparison indicates that the value of the parameter is below the network status threshold, the terminal 110 detects that the network status is smooth. When the result of the comparison indicates that the value of the parameter falls within a tolerance range of the network status threshold, the terminal 110 detects that the network status is normal.

The terminal 110 is configured to determine a transmission order when it transmits the generated traffic request signal to the content provider 150. Specifically, the terminal 110 determines the transmission order of the non-real-time traffic request signal to be transmitted to the content provider 150 based on an operation or instruction sequence inputted by a user, e.g., through the input units, or a type of contents. The terminal 110 transmits the non-real-time traffic request signal to the content provider 150 based on the determined transmission order.

The policy answer signal received by the terminal 110 from the policy provider 140 is a signal including at least one piece of information among policy request cycle information based on the network status, threshold value, and priority information. The threshold value is information including respective threshold values for a plurality of parameters related to the traffic control. The threshold value is adaptively set based on at least one piece of information among the number of terminals assigned to a transmitter 210 or 220 in the path network (any one of 122, 124, 126, . . . , and 128), traffic transmission status of each terminal, and transmission request time of each terminal. The threshold value serves to limit the number of terminals assigned to each transmitter in the path network (any one of 122, 124, 126, . . . , and 128) within a predetermined range. The priority information has a value that is set to allow the traffic to be transmitted on a priority basis at the most available time (time of a day with the smallest number of calls generated) or a priority value that is set based on a type of the path network (any one of 122, 124, 126, . . . , and 128). The traffic parameter includes Rx, Tx, Ec/Io, transmission rate, the number of assigned terminals, and the like.

The following description details a step of adaptively controlling the non-real-time traffic by detecting the network status by the terminal 110 according to the at least one first embodiment among exemplary embodiments of the present disclosure. The terminal 110 compares the transmission rate at the time of the download or the upload with the threshold value included in the policy answer signal, and when a result of the comparison indicates that the transmission rate is below the threshold value, detects that the network is busy and suspends the download or the upload (traffic). When main quality indexes of Rx and Tx among the parameters related to the traffic control included in the policy answer signal are below the threshold value, the terminal 110 detects that the network status is busy, and performs a control to suspend the download or the upload (traffic). When a distance between a terminal assigned to the transmitter 210 or 220 in the path network (any one of 122, 124, 126, . . . , and 128) and the transmitter 210 or 220 exceeds a predetermined distance, the terminal 110 suspends the download or the upload (traffic) for a resource efficiency of the path network (any one of 122, 124, 126, . . . , and 128). When a battery level of the terminal is below the threshold value or a temperature of the terminal exceeds the threshold value, the terminal 110 suspends the download or the upload (traffic).

A step of performing a retry of transmitting the suspended non-real-time traffic by the terminal 110 according to the first embodiment is described below. The terminal 110 operates to cause the retry of the download or the upload (traffic) to be repeatedly performed based on the policy answer signal. When a time of a timer elapses, the terminal 110 performs the retry of the download or the upload (traffic). When the path network (any one of 122, 124, 126, . . . , and 128) is switched to other network, the terminal 110 performs the retry of the download or the upload (traffic). When a new non-real-time traffic request signal is received, the terminal 110 performs the retry of the download or the upload (traffic).

An operation of the terminal 110 according to the second embodiment to adaptively control the non-real-time traffic by using overload information is described. The terminal 110 generates the non-real-time traffic request signal by an operation or an instruction inputted by a user. The non-real-time traffic request signal is a sort of traffic request signal. When the user inputs an instruction to request for particular contents by operating the terminal 110, the terminal 110 transmits a traffic request signal for the contents to the content provider 150. The terminal 110 controls the traffic based on a network status of the path network (any one of 122, 124, 126, . . . , and 128), and when the network status is busy, this traffic request signal works as the non-real-time traffic request signal. The same concept can apply to a non-real-time traffic answer signal corresponding to the non-real-time traffic request signal. The terminal 110 transmits the policy request signal including network identification information on the path network (any one of 122, 124, 126, . . . , and 128) under communication to the policy provider 140. The terminal 110 receives the policy answer signal including overload area information in response to the policy request signal from the policy provider 140, and detects the network status of the path network (any one of 122, 124, 126, . . . , and 128) based on the policy answer signal. The terminal 110 downloads the non-real-time traffic answer signal corresponding to the non-real-time traffic request signal from the content provider 150 via the path network (any one of 122, 124, 126, . . . , and 128) or uploads the contents stored in the terminal 110 to the content provider 150. When performing the download or the upload, the terminal 110 controls the download or the upload (traffic) based on the overload area information included in the policy answer signal.

A step of using the overload information by the terminal 110 is described in detail below. The terminal 110 checks the overload area information included in the policy answer signal, and when a result of the check indicates that the transmitter identification information on the path network (any one of 122, 124, 126, . . . , and 128) is included in the overload area information, detects that the network status is busy and suspends the download or the upload (traffic) for a predetermined time. When the result of the check indicates that the transmitter identification information is not included in the overload area information, the terminal 110 determines whether or not to control the traffic based on the network status of the path network (any one of 122, 124, 126, . . . , and 128) detected at the time of the download or the upload, and controls the download or the upload based on a result of the determination. The terminal 110 compares the transmission rate at the time of the download or the upload with the threshold value included in the policy answer signal, and when a result of the comparison indicates that the transmission rate is below the threshold value, detects that the network status is busy and suspends the download or the upload (traffic).

When the terminal 110 is not located in the overload area, the operation is as follows. A step of performing the adaptive non-real-time traffic control by using the traffic control application 112 installed in the terminal 110 is described. The terminal 110 generates the traffic request signal by an operation or an instruction inputted by a user, transmits the policy request signal to the policy provider 140, and receives the policy answer signal corresponding to the policy request signal. The terminal 110 downloads the non-real-time traffic answer signal corresponding to the non-real-time traffic request signal from the content provider 150 via the path network (any one of 122, 124, 126, . . . , and 128) or uploads the contents stored in the terminal 110 to the content provider 150. The terminal 110 determines whether or not to control the traffic based on the network status of the path network (any one of 122, 124, 126, . . . , and 128) detected at the time of the download or the upload, and controls the download or the upload (traffic) based on the result of the determination. When downloading the non-real-time traffic answer signal from the content provider 150, the terminal 110 causes the non-real-time traffic answer signal to be downloaded to a predetermined storage area depending on a data type of the non-real-time traffic answer signal. The terminal 110 transmits the policy request signal to the policy provider 140 based on the policy request cycle information included in the policy answer signal.

A method for operating the traffic control application 112 according to the first and second embodiments is described below. The traffic control application 112 can be implemented to separately operate in a form of including a separate software function or hardware function performed by the terminal 110 or can be implemented in a form of interlocking with the separate software function or hardware function performed by the terminal 110.

It is preferred that the traffic control application 112 be installed in the terminal 110 and operate by using various hardware devices included in the terminal 110, but not limited to this scheme. Alternatively, the traffic control application 112 can operate by being implemented as a separate unit. The traffic control application 112 can operate interlocking with applications installed in the terminal 110.

An operation of the traffic control application 112 according to the first embodiment is described. The traffic control application 112 is a sort of program that is installed in the terminal 110, detects the network status of the path network (any one of 122, 124, 126, . . . , and 128) via which the terminal 110 performs a communication, and manages adaptive data traffic based on the detected network status. Specifically describing the operation of the traffic control application 112, the traffic control application 112 generates a non-real-time traffic request signal by an operation or an instruction inputted by a user, and transmits the policy request signal to the policy provider 140. The traffic control application 112 receives the policy answer signal corresponding to the policy request signal, and detects the network status of the path network (any one of 122, 124, 126, . . . , and 128) based on the policy answer signal corresponding to the policy request signal. The traffic control application 112 downloads the non-real-time traffic answer signal corresponding to the non-real-time traffic request signal from the content provider 150 via the path network (any one of 122, 124, 126, . . . , and 128) or uploads the contents stored in the terminal 110 to the content provider 150. The traffic control application 112 determines whether or not to control the traffic based on the network status at the time of the download or the upload, and controls the download or the upload (traffic) based on the result of the determination.

An operation of the traffic control application 112 according to the second embodiment to control the adaptive non-real-time traffic by using the overload information is described below. The traffic control application 112 generates the non-real-time traffic request signal by an operation or an instruction inputted by a user by interlocking with the terminal 110 in which the traffic control application 112 is installed, and transmits the policy request signal including the network identification information on the path network (any one of 122, 124, 126, . . . , and 128) via which a communication is performed to the policy provider 140. The traffic control application 112 receives the policy answer signal including the overload area information in response to the policy request signal from the policy provider 140. The traffic control application 112 downloads the non-real-time traffic answer signal corresponding to the non-real-time traffic request signal from the content provider 150 via the path network (any one of 122, 124, 126, . . . , and 128) or uploads the contents stored in the terminal 110 to the content provider 150. The traffic control application 112 controls the download or the upload (traffic) based on the overload area information included in the policy answer signal at the time of the download or the upload.

The network 120 is capable of performing data transmission and reception by a communication protocol using various wired or wireless communication technologies including a 3G network 122, a 4G network 124, and a wireless LAN network 126, and an Nth network (synchronous network, an Internet network, an intranet network, and a satellite communication network) 128. The network 120 includes a cloud computing network being coupled with the content provider 150, which can store computing resources such as software and hardware and provide the computing resources to the terminal 110. The cloud computing mentioned here means a computer environment in which information is permanently stored in a server on the Internet but temporarily stored in a client terminal device such as a desktop computer, a tablet computer, a notebook computer, a net book computer, and a smart phone. The cloud computing means a computer environment connection network in which all pieces of information on a user are stored in the server on the Internet and the user can use the information in any place at any time by using various information technology (IT) devices. The network 120 is described in detail below with reference to FIG. 2.

A transmitter load manager 130 is a device that interlocks with the transmitter 210 or 220 in the network 120 and monitors an output value of the transmitter 210 or 220. The transmitter load manager 130 collects transmitter identification information (for example, cell ID) received from the interlocking transmitter 210 or 220 to generate a transmitter identification list, and selects an overloaded transmitter from the transmitter identification list by using the output value received from the transmitter 210 or 220 to generate an overloaded transmitter list. The transmitter load manager 130 interlocks with the policy provider 140, and transmits at least one of the transmitter identification list or the overloaded transmitter list to the policy provider 140 at a constant cycle in response to a request from the policy provider 140.

The policy provider 140 performs a function of detecting the network status of each terminal assigned to the path network (any one of 122, 124, 126, . . . , and 128) and determining and managing a policy related to the data traffic based on the detected network status. The policy provider 140 interlocks with the terminal 110 via the network 120, when the policy request signal is received from the terminal 110, generates the policy answer signal corresponding to the policy request signal based on the network status that is a status of the network 120, and transmits the policy answer signal to the terminal 110. The policy provider 140 may use a 3G PCRF (policy charging and rules function) 218 or a 4G PCRF 230.

A step of generating the policy answer signal corresponding to the policy request signal received from the terminal 110 by the policy provider 140 is described. The policy provider 140 checks the network status in order to generate the policy answer signal, and generates the policy answer signal including at least one of the policy request cycle information according to the network status, the threshold value, or the priority information. The threshold value is information including respective threshold values for a plurality of parameters related to the traffic control. The threshold value is a value that is adaptively set based on at least one piece of information among the number of terminals assigned to the transmitter 210 or 220 in the path network (any one of 122, 124, 126, . . . , and 128), traffic transmission status of each terminal, and transmission request time of each terminal. The threshold value has a value for limiting the number of terminals assigned to each transmitter in the path network (any one of 122, 124, 126, . . . , and 128) within a predetermined range. The priority information has a value that is set to allow the traffic to be transmitted on a priority basis at the most available time (time of a day with the smallest number of calls generated) or a priority value that is set based on a type of the path network (any one of 122, 124, 126, . . . , and 128). The policy provider 140 periodically transmits such a policy answer signal to the terminal 110.

A step of detecting the path network (any one of 122, 124, 126, . . . , and 128) by the policy provider 140 is described. The policy provider 140 detects any one of busy status, normal status, and smooth status based on a wave condition signal received from the path network (any one of 122, 124, 126, . . . , and 128). The policy provider 140 detects the network status by comparing at least one parameter among parameters of Rx, Tx, Ec/Io, RSSI (received signal strength indication), transmission rate, number of assigned terminals, which are included in the wave condition signal, with a preset network status threshold. When a result of the comparison indicates that the value of the parameter exceeds the network status threshold, the policy provider 140 detects that the network status is busy. When the result of the comparison indicates that the value of the parameter is below the network status threshold, the policy provider 140 detects that the network status is smooth. When the result of the comparison indicates that the value of the parameter falls within a tolerance range of the network status threshold, the policy provider 140 detects that the network status is normal.

An operation of the policy provider 140 according to the second embodiment to apply a policy using the overload information is described. The policy provider 140 receives the policy request signal including the transmitter identification information on the path network (any one of 122, 124, 126, . . . , and 128) via which a communication is performed from the terminal 110. The policy provider 140 receives the overloaded transmitter list from the transmitter load manager 130, compares the received transmitter identification information with the overloaded transmitter list, and check if the terminal 110 is located in the overload area. The policy provider 140 generates the policy answer signal including a policy determined based on a result of the check, and transmits the generated policy answer signal to the terminal 110. The traffic of the terminal 110 can be suspended by using the policy answer signal with the determination of the policy provider 140 that the terminal 110 is located in the overload area, but not limited to this scheme. Alternatively, the policy provider 140 only transmits the overload area information to the terminal 110, such that the terminal 110 can suspend the traffic by determining whether or not it is located in the overload area based on the information.

A step of using the overload information by the policy provider 140 is described in detail. When the result of determination indicates that the terminal 110 is located in the overload area, the policy provider 140 detects that the network status of the path network (any one of 122, 124, 126, . . . , and 128) is busy, and generates the policy answer signal in which the policy is changed to suspend the upload of the contents stored in the terminal 110 to the content provider 150 via the path network time by the terminal 110 or the download of the non-real-time traffic answer signal corresponding to the non-real-time traffic request signal from the content provider 150 by the terminal 110 for a preset. When the result of the determination indicates that the terminal 110 is not located in the overload area, the policy provider 140 generates the policy answer signal in which the policy according to the network status is applied. The policy provider 140 generates the policy answer signal including at least one of the policy request cycle information according to the network status, the threshold value, or the priority information.

The content provider 150 is a sort of server that performs contents storage and management of transmitting and receiving the data traffic of the terminal 110. The content provider 150 provides the non-real-time traffic answer signal including the contents corresponding to the non-real-time traffic request signal to the terminal 110. The content provider 150 transmits the non-real-time traffic answer signal including the contents corresponding to the non-real-time traffic request signal received from the terminal 110 via the path network (any one of 122, 124, 126, . . . , and 128) in the network 120 to the terminal 110 via the network 120 The contents mentioned here may include at least one of text data, image data, or video data. In terms of hardware, the content provider 150 is configured in the same manner as a typical web server or network server. In terms of software, the content provider 150 includes a program module implemented by using languages such as C, C++, Java, Visual Basic, and Visual C. The content provider 150 can be implemented in a form of the web server or network server. The web server is a computer system that is generally connected to at least one of a plurality of unspecified clients or other server via an open computer network such as the Internet, receives a work request of a client or other server, and derive and provide a work result and computer software (web server program) installed to do so.

The following will describe a step of controlling the non-real-time traffic according to the first embodiment by the terminal 110, the policy provider 140, and the content provider 150, which are constituent elements shown in FIG. 1. The terminal 110 receives the policy answer signal from the policy provider 140, which checks the network status of the path network (any one of 122, 124, 126, . . . , and 128) via which a communication is performed, and adaptively performs the traffic control.

ⓐ The terminal 110 manages the traffic on a non-real-time basis based on the policy answer signal received from the policy provider 140 by using the traffic control application 112 installed therein.

ⓑ The terminal 110 detects the network status (monitors the status of various layers including physical layer, RF layer, MAC layer, IP layer, and the like during the traffic transmission (download or upload) by using the traffic control application 112.

ⓒ The terminal 110 controls whether or not to suspend the traffic transmission (download or upload) based on the traffic control application 112 installed therein.

ⓓ The terminal 110 controls the traffic transmission (download or upload) by sharing the traffic transmission policy (traffic answer signal) with the policy provider 140 based on a periodic or additional event by using the traffic control application 112.

ⓔ The policy provider 140 dynamically changes the threshold value, the priority information, and the like included in the policy answer signal according to a traffic transmission request time of a user of the traffic (using the traffic control application 112 installed in the terminal 110).

ⓕ The policy provider 140 manages traffic users per each transmitter 210 or 220 in the network 120, to perform a policy change for controlling the number of users to be simultaneously permitted to use the traffic.

The following will describe a step of controlling the non-real-time traffic by using the overload information by the terminal 110, the transmitter load manager 130, the policy provider 140, and the content provider 150, which are constituent elements shown in FIG. 1. The terminal 110 receives the policy answer signal from the policy provider 140 that checks the network status of the path network (any one of 122, 124, 126, . . . , and 128) via which a communication is performed, and adaptively controls the traffic.

① The policy provider 140 periodically receives a cell ID (identification information) list of the overloaded transmitters from the transmitter load manager 130. The policy provider 140 receives the overloaded transmitter list from the transmitter load manager 130. The transmitter load manager 130 collects the transmitter identification information (for example, cell ID) received from the interlocking transmitter 210 or 220, to generate the transmitter identification list, and selects the overloaded transmitters from the transmitter identification list by using the output value received from the transmitter 210 or 220, to generate the overloaded transmitter list.

② At the time of inquiry, the terminal 110 inquires a policy that should be currently used by the terminal 110 to the policy provider 140 with the cell ID information of the transmitter where the terminal 110 is located. The terminal 110 transmits the policy request signal including the network identification information on the path network (any one of 122, 124, 126, . . . , and 128) via which a communication is performed to the policy provider 140. The policy provider 140 receives the policy request signal including the transmitter identification information on the path network (any one of 122, 124, 126, . . . , and 128) via which a communication is performed from the terminal 110.

③ The policy provider 140 compares the cell ID included in the policy request signal with the overloaded transmitter list, and when a result of the comparison indicates that the terminal 110 is located in the overload area, responds a policy to re-inquire the policy after a predetermined time or to suspend the traffic (contents providing service). The policy provider 140 compares the received transmitter identification information with the overloaded transmitter list, to check if the terminal 110 is located in the overload area, generates the policy answer signal including a policy determined based on a result of the check, and transmits the generated policy answer signal to the terminal 110. When the result of the check indicates that the terminal 110 is located in the overload area, the policy provider 140 detects that the network status of the path network (any one of 122, 124, 126, . . . , and 128) is busy, and generates the policy answer signal in which the policy is changed to suspend the upload of the contents stored in the terminal 110 to the content provider 150 via the path network by the terminal 110 or the download of the non-real-time traffic answer signal corresponding to the non-real-time traffic request signal from the content provider 150 by the terminal 110 for a preset time.

④ When the terminal 110 is located in the overload area by using the response from the policy provider 140, the terminal 110 stands by without transmitting the traffic (contents providing service) for a predetermined time, and then re-inquires the policy. The terminal 110 first checks the overload area included in the policy answer signal, when the result of the check indicates that the transmitter identification information on the path network (any one of 122, 124, 126, . . . , and 128) via which a communication is performed is included in the overload area network, detects that the network status is busy, and suspends the download or the upload (traffic) for a predetermined time. Thereafter, the terminal 110 re-transmits the policy request signal to the policy provider 140 based on the policy request cycle information included in the policy answer signal.

⑤ When the terminal 110 is not located in the overload area, the terminal 110 recognizes the congestion based on the policy responded from the policy provider 140, and operates the service. When the result of the check indicates that the terminal 110 is not located in the overload area, the policy provider 140 generates the policy answer signal applied with the policy based on the network status. The terminal 110 determines whether or not to control the traffic based on the network status of the path network (any one of 122, 124, 126, . . . , and 128) detected at the time of the download or the upload, and controls the download or the upload (traffic) based on the result of the determination.

Figure 2:
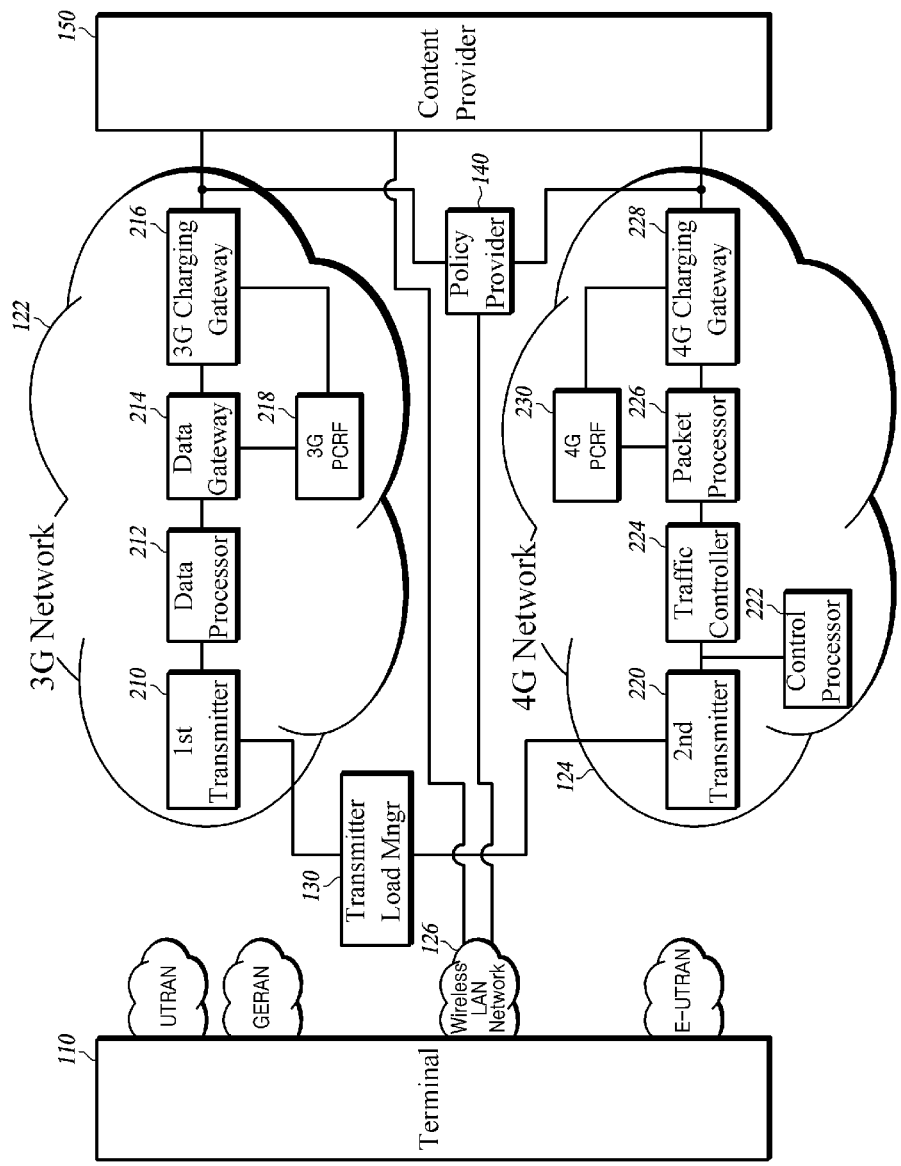
FIG. 2 is a block diagram of a network according to at least one embodiment of the present disclosure.

FIG. 2 is a block diagram of a network according to at least one embodiment of the present disclosure.

The network 120 includes the 3G network 122, the 4G network 124, and the wireless LAN network 126.

The 3G network 122 includes a first transmitter 210, a data processor 212, a data gateway 214, a 3G charging gateway 216, and a 3G PCRF 218. The constituent elements of FIG. 2 are not limited to these elements.

The UTRAN connected to the 3G network 122 shown in FIG. 2 is a UMTS (universal mobile telecommunications system) Terrestrial Radio Access Network. The GERAN is a GSM (global system for mobile communications) EDGE (enhanced data rates for GSM evolution) Radio Access Network. The UTRAN and the GERAN are included in the 3G network 122.

As the terminal 110 supports both the 3G network 122 and the 4G network 124, the terminal 110 communicates with the UTRAN by using a Uu interface and communicates with the GERAN by using a Um interface in the 3G network 122. The UTRAN communicates with the data processor 212 by using an Iu-ps interface and communicates with a switchboard by using an Iu-cs interface. The GERAN communicates with the data processor 212 by using a Gb interface and communicates with the switchboard by using an A interface. As the terminal 110 supports both the 3G network 122 and the 4G network 124, the data processor 212 communicates with the data gateway 214 by using a Gn interface and communicates with the 3G PCRF 218 by using a Gx interface, and communicates with the switchboard by using a Gs interface.

The first transmitter 210 is a transmitter in the 3G network 122. The first transmitter 210 performs general functions required for processing a wireless call, such as location registration, wireless channel assignment, and handoff in the 3G network 122. It is preferred that the first transmitter 210 be a node B, but not limited to this scheme. The first transmitter 210 is a device that receives a call request signal from the terminal 110 by using a traffic channel among signal channels in the 3G network 122, and performs baseband signal processing, wired-wireless switch, wireless signal transmission and reception, and the like. The first transmitter 210 receives the call request signal or the non-real-time traffic request signal from the terminal 110 by using the traffic channel among the signal channels, and transmits the received call request signal or non-real-time traffic request signal to the content provider 150 via a transmission controller. It is preferred that the first transmitter 210 be a transmitter, but not limited to this scheme, thus being capable of expansively applying to the UTRAN and the GERN.

The data processor 212 performs a function of transmitting a data packet to the terminal 110 that is moving, generating call contents information and charging data for the data packet transmitted to the terminal 110, and transmitting the generated data to the 3G charging gateway 216. The data processor 212 may be divided into a plurality of data processors depending on an installation area. It is preferred that the data processor 212 be implemented with an SGSN (serving GPRS support node), but is not limited to this scheme.

The data gateway 214 is a node responsible for a connection function between a backbone network and an external packet data network, which converts the packet data received from the data processor 212 into an appropriate packet data protocol (PDP) format (for example, IP, X.25), transmits the converted packet data, and converts a PDP (packet data protocol) address in received packet data into a global system for mobile communications (GSM) address of a receiver. The data gateway 214 stores an address of a current user in the data processor located in a register of the data processor 212 and a user profile, and further performs an authentication and a charging function. It is preferred that the data gateway 214 be a GGSN (gateway GPRS support node), but is not limited to this scheme.

The 3G charging gateway 216 collects call contents information and charging data for data packets received by the terminal 110 of an overseas subscriber while moving from a plurality of different data processors 212. The 3G charging gateway 216 performs a function of generating integrated changing data by reviewing the call contents information and integrating charging data having the same charging ID into a single piece of data, and transmitting the integrated charging data to a charging center. The 3G charging gateway 216 performs a function of generating the integrated charging data by collecting data packet amount of all charging data having the same charging ID. The 3G charging gateway 216 collects the call contents information and the charging data from at least one data processor among the plurality of data processors 212 according to a handover of the terminal 110. The 3G charging gateway 216 generates the integrated charging data by using an IMSI (international mobile subscriber identity) of the call contents information and the charging ID. The charging ID is a value assigned from the data gateway 214 when the data processor 212 generates the charging data of the terminal 110. The charging ID is a value that is not changed even when the same subscriber moves a plurality of data processors 212 within the same data gateway 214.

The 3G charging gateway 216 is a device that performs a charging based on contents usage information on the contents transmitted to the terminal 110 from the content provider 150. When the terminal 110 receives the contents from the content provider 150, the 3G charging gateway 216 updates the contents usage information, and collects results of charging a required expense of the terminal 110 based on the updated information.

The 3G PCRF 218 can detect a packet included in service data by using a preset rule, and apply an approved QoS (Quality of Service). The 3G PCRF 218 operates based on the policy determined by the policy provider 140 and a charging control function by the 3G charging gateway 216. The 3G PCRF 218 can detect the service data of the policy provider 140 and the 3G charging gateway 216, and perform a network control such as the QoS.

The 4G network 124 is described below. The 4G network 124 includes a second transmitter 220, a control processor 222, a traffic processor 224, a packet processor 226, a 4G charging gateway 228, and a 4G PCRF 230. The constituent elements of the 4G network 124 shown in FIG. 2 are not limited to these elements.

The E-UTRAN connected to the 4G network 124 shown in FIG. 2 means Evolved-UTRAN. The E-UTRAN is included in the 4G network 124. As the terminal 110 supports both the 3G network 122 and the 4G network 124, the terminal 110 communicates with the E-UTRAN by using an LTE-Uu interface and the E-UTRAN communicates with the control processor 222 by using an S1-U interface in the 4G network 124.

The e node B is a device that supports the LTE (long term evolution), which performs functions of RF conversion of a transmission signal, transmission and reception, signal strength, quality measurement, baseband signal processing, channel card (channel card resource management), and the like. The second transmitter 220 and the EPC (evolved packet core) (i.e., the control processor 222, the traffic processor 224, and the packet processor 226) can be collectively referred to as an EPS (evolved packet system). The second transmitter 220 is a transmitter in an LTE network that is the 4G network 124. The second transmitter 220 performs general functions required for processing a wireless call, such as location registration, wireless channel assignment, and handoff in the 4G network 124. It is preferred that the second transmitter 220 be a node B, but not limited to this scheme. The second transmitter 220 is a device that receives a call request signal from the terminal 110 by using a traffic channel among signal channels in the 4G network 124, and performs baseband signal processing, wired-wireless switch, wireless signal transmission and reception, and the like. The second transmitter 220 receives the call request signal or the non-real-time traffic request signal from the terminal 110 by using the traffic channel among the signal channels, and transmits the received call request signal or non-real-time traffic request signal to the content provider 150 via a transmission controller. It is preferred that the second transmitter 220 be a transmitter, but not limited to this scheme, thus being capable of expendably applying to the E-UTRAN.

The control processor 222, the traffic processor 224, and the packet processor 226 can be collectively referred to as a packet core. The packet core means an EPC. The control processor 222 basically performs a function of performing mobility management for the terminal 110. It is preferred that the control processor 222 be an MME (mobile management entity), but not limited to this scheme. The control processor 222 is responsible for a call control such as location registration, paging, and authentication, and performs a legal monitoring function with respect to a call controller and a data call control function. The control processor 222 is a node for managing subscriber information and mobility of the terminal 110, which is responsible for session management, idle subscriber management, subscriber management, paging, subscriber authentication function, and the like.

It is preferred that the traffic processor 224 be an S-GW (serving gateway), but not limited to this scheme. The traffic processor 224 is a gateway for an access network, and manages mobility in the 3G network 122 the traffic processor 224 is responsible for a legal monitoring of the call traffic and the like, and performs a traffic processing function. The traffic processor 224 is a node for session control for handling a payload traffic according to a set session and user plane, which supports inter-handover by interlocking with the second transmitter 220, sets PDP context with the packet processor 226, and transfers a PDU (packet data unit) by using tunneling. As the traffic processor 224 and the control processor 222 are separately implemented, flexible expansion is possible with increase of the traffic or increase of the control signals.

It is preferred that the packet processor 226 be a P-GW (PDN gateway), but is not limited to this scheme. The packet processor 226 is a gateway for a PDN (packet data network) such as IMS (IP multimedia subsystem), Internet, which manages mobility with respect to a Non-3GPP network, performs charging according to the policy, and blocks a harmful packet. The packet processor 226 assigns an IP of the terminal 110, maintains routing information with the traffic processor 224 and the external network for a packet service as the session control interlocking with the external Internet network and the Non-3GPP network and the user plane, and has tunneling and IP routing functions. The packet processor 226 transfers the PDU to the traffic processor 224 and the external network.

The 4G charging gateway 228 is a device that performs a charging based on contents usage information on the contents transmitted to the terminal 110 from the content provider 150. When the terminal 110 receives the contents from the content provider 150, the 4G charging gateway 228 updates the contents usage information, and collects results of charging a required expense of the terminal 110 based on the updated information.

The 4G PCRF 230 can detect a packet included in service data by using a preset rule, and apply an approved QoS (Quality of Service). The 4G PCRF 230 operates based on the policy determined by the policy provider 140 and a charging control function by the 4G charging gateway 228. The 4G PCRF 230 can detect the service data of the policy provider 140 and the 4G charging gateway 228, and perform a network control such as the QoS.

Figure 3:
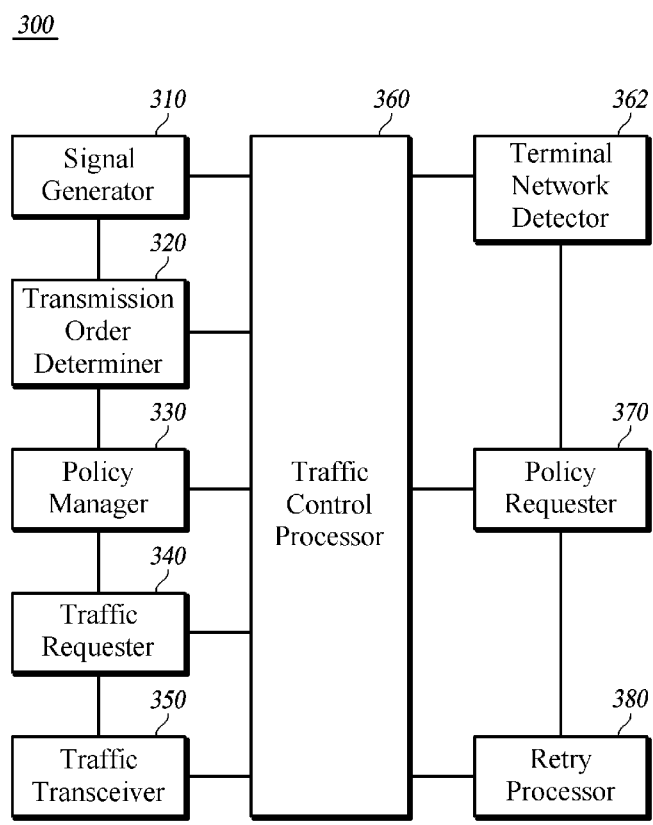
FIG. 3 is a block diagram of a traffic control apparatus according to at least one embodiment of the present disclosure.

FIG. 3 is a block diagram of a traffic control apparatus according to at least one embodiment of the present disclosure.

Although FIG. 3 is an internal configuration of the terminal 110 substantially including the traffic control application 112, the terminal 110 including the traffic control application 112 can be implemented as a traffic controller 300, which is a separate device. The traffic controller 300 shown in FIG. 3 is an example in which the traffic control application 112 is implemented as a separate device, including a signal generator 310, a transmission order determiner 320, a policy manager 330, a traffic requester 340, a traffic transceiver 350, a traffic control processor 360, a terminal network detector 362, a policy requester 370, and a retry processor 380. The constituent elements of the traffic controller 300 are not limited to these elements. Other components of the terminal 110 (i.e., the traffic controller 300), such as each of the signal generator 310, the transmission order determiner 320, the policy manager 330, the traffic requester 340, the traffic transceiver 350, the traffic control processor 360, the terminal network detector 362, the policy requester 370, and the retry processor 380 are implemented by, or includes, one or more processors and/or application-specific integrated circuits (ASICs). The traffic controller 300 comprises input units such as one or more buttons, a touch screen, a mic and so on, and output units such as a display, an indicator and so on.

The signal generator 310 generates the non-real-time traffic request signal by an operation or an instruction inputted by a user. The transmission order determiner 320 is configured to determine a transmission order when transmitting generated traffic request signals to the content provider 150. The transmission order determiner 320 determines the transmission order of the non-real-time traffic request signals to be transmitted to the content provider 150 based on an operation or instruction sequence inputted by the user or the priority information based on a type of the contents.

The policy manager 330 according to at least one first embodiment transmits the policy request signal to the policy provider 140, and receives the policy answer signal corresponding to the policy request signal. The policy answer signal is a signal including at least one of the policy request cycle information according to the network status, the threshold value, or the priority information. The threshold value is information including respective threshold values for a plurality of parameters related to the traffic control. The threshold value is a value that is adaptively set based on at least one piece of information among the number of terminals assigned to the transmitter 210 or 220 in the path network (any one of 122, 124, 126, . . . , and 128), traffic transmission status of each terminal, and transmission request time of each terminal. The threshold value has a value for limiting the number of terminals assigned to each transmitter in the path network (any one of 122, 124, 126, . . . , and 128) within a predetermined range. The priority information has a value that is set to allow the traffic to be transmitted on a priority basis at the most available time or a priority value that is set based on a type of the path network (any one of 122, 124, 126, . . . , and 128).

The policy manager 330 according to at least one second embodiment transmits the policy request signal to the policy provider 140, and receives the policy answer signal corresponding to the policy request signal. The policy manager 330 transmits the policy request signal including the network identification information on the path network via which a communication is performed to the policy provider 140, and receives the policy answer signal including the overload area information in response to the policy request signal. The policy answer signal is a signal including at least one of the policy request cycle information according to the network status, the threshold value, or the priority information. The threshold value is a value that is adaptively set based on at least one piece of information among the number of terminals assigned to the transmitter 210 or 220 in the path network (any one of 122, 124, 126, . . . , and 128), traffic transmission status of each terminal, and transmission request time of each terminal. The threshold value has a value for limiting the number of terminals assigned to each transmitter in the path network (any one of 122, 124, 126, . . . , and 128) within a predetermined range. The priority information has a value that is set to allow the traffic to be transmitted on a priority basis at the most available time or a priority value that is set based on a type of the path network (any one of 122, 124, 126, . . . , and 128).

The traffic requester 340 transmits the non-real-time traffic request signal to the content provider 150 based on the transmission order determined by the transmission order determiner 320. The traffic transceiver 350 downloads the non-real-time traffic answer signal corresponding to the non-real-time traffic request signal from the content provider 150 via the path network (any one of 122, 124, 126, . . . , and 128) or uploads the contents stored in the terminal 110 to the content provider 150. When downloading the non-real-time traffic answer signal from the content provider 150, the traffic transceiver 350 causes the non-real-time traffic answer signal to be downloaded to a predetermined storage area depending on a data type of the non-real-time traffic answer signal.

A step of adaptively controlling the non-real-time traffic by detecting the network status by the traffic control processor 360 according to at least one first embodiment is described below. The traffic control processor 360 determines whether or not to control the traffic based on the network status of the path network (any one of 122, 124, 126, . . . , and 128) detected by the terminal network detector 362 at the time of the download or the upload, and controls the download or the upload (traffic) based on the result of the determination. Specifically describing the traffic control processor 360, the traffic control processor 360 compares the transmission rate at the time of the download or the upload detected by using the terminal network detector 362 with the threshold value included in the policy answer signal, and when a result of the comparison indicates that the transmission rate is below the threshold value, detects that the network is busy and suspends the download or the upload (traffic). When main quality indexes of Rx and Tx among the parameters related to the traffic control included in the policy answer signal are below the threshold value, the traffic control processor 360 detects that the network status is busy by using the terminal network detector 362, and suspends the download or the upload (traffic). When a distance between a terminal assigned to the transmitter 210 or 220 in the path network (any one of 122, 124, 126, . . . , and 128) and the transmitter 210 or 220 exceeds a predetermined distance by using the terminal network detector 362, the traffic control processor 360 suspends the download or the upload (traffic) for a resource efficiency of the path network (any one of 122, 124, 126, . . . , and 128). When a battery level of the terminal is below the threshold value or a temperature of the terminal exceeds the threshold value, the traffic control processor 360 suspends the download or the upload (traffic).

The traffic control processor 360 according to at least one second embodiment controls the download or the upload (traffic) based on the overload area information at the time of the download or the upload. A step of using the overload information by the traffic control processor 360 is described below. When the result of checking the overload area information indicates that the transmitter identification information on the path network (any one of 122, 124, 126, . . . , and 128) via which a communication is performed is included in the overload area information, the traffic control processor 360 detects that the network status is busy, and suspends the download or the upload (traffic) for a predetermined time. When the result of checking the overload area information indicates that the transmitter identification information is not included in the overload area information, the traffic control processor 360 determines whether or not to control the traffic based on the network status of the path network (any one of 122, 124, 126, . . . , and 128) detected at the time of the download or the upload, and controls the download or the upload (traffic) based on the result of the determination. The traffic control processor 360 compares the transmission rate at the time of the download or the upload with the threshold value included in the policy answer signal, when the transmission rate is below the threshold value, detects that the network status is busy, and suspends the download or the upload (traffic).

The terminal network detector 362 detects the network status of the path network (any one of 122, 124, 126, . . . , and 128) via which the terminal 110 performs a communication. A step of detecting the network status of the path network (any one of 122, 124, 126, . . . , and 128) by the terminal network detector 362 is described below. The terminal network detector 362 detects any one of busy status, normal status, and smooth status based on a wave condition signal received from the path network (any one of 122, 124, 126, . . . , and 128). The terminal network detector 362 detects the network status by comparing at least one parameter among parameters of Rx, Tx, Ec/Io, RSSI, transmission rate, the number of assigned terminals, which are included in the wave condition signal, with a preset network status threshold. When a result of the comparison indicates that the value of the parameter exceeds the network status threshold, the terminal network detector 362 detects that the network status is busy. When the result of the comparison indicates that the value of the parameter is below the network status threshold, the terminal network detector 362 detects that the network status is smooth. When the result of the comparison indicates that the value of the parameter falls within a tolerance range of the network status threshold, the terminal network detector 362 detects that the network status is normal. The policy requester 370 transmits the policy request signal to the policy provider 140 based on the policy request cycle information included in the policy answer signal.

A step of performing a retry of transmitting the suspended non-real-time traffic by the retry processor 380 is described below. The retry processor 380 operates to cause the retry of the download or the upload (traffic) to be repeatedly performed based on the policy answer signal. Specifically describing the operation of the retry processor 380, when a time of a timer elapses, the retry processor 380 performs the retry of the download or the upload (traffic). When the path network (any one of 122, 124, 126, . . . , and 128) is switched to other network, the retry processor 380 performs the retry of the download or the upload (traffic). When a new non-real-time traffic request signal is received from the signal generator 310, the retry processor 380 performs the retry of the download or the upload (traffic).

Figure 4:
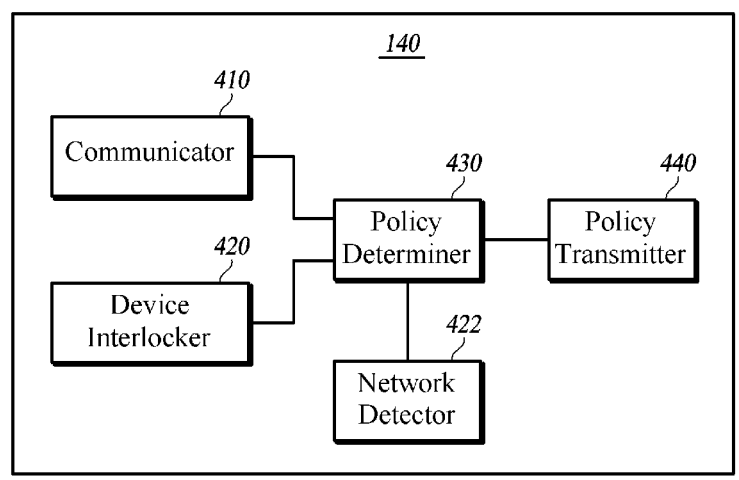
FIG. 4 is a block diagram of a policy controller according to at least one embodiment of the present disclosure.

FIG. 4 is a block diagram of a policy controller according to at least one second embodiment among exemplary embodiments of the present disclosure.

The policy provider 140 includes a communicator 410, a device interlocker 420, a network detector 422, a policy determiner 430, and a policy transmitter 440. The constituent elements included in the policy provider 140 are not limited to these elements. Other components of the policy provider 140, such as each of the communicator 410, the device interlocker 420, the network detector 422, the policy determiner 430, and the policy transmitter 440 are implemented by, or includes, one or more processors and/or application-specific integrated circuits (ASICs). The policy provider 140 comprises input units such as one or more buttons, a touch screen, a mic and so on, and output units such as a display, an indicator and so on.

The communicator 410 interlocks with the terminal 110 via the network 120, and receives the policy request signal from the terminal 110. The communicator 410 receives the policy request signal including the transmitter identification information on the path network (any one of 122, 124, 126, . . . , and 128) via which a communication is performed from the terminal 110.

The device interlocker 420 receives the overloaded transmitter list from the transmitter load manager 130. The transmitter load manager 130 collects transmitter identification information (for example, cell ID) received from the interlocking transmitter 210 or 220 to generate a transmitter identification list, and selects an overloaded transmitter from the transmitter identification list by using the output value received from the transmitter 210 or 220 to generate the overloaded transmitter list. The network detector 422 detects the network status of each terminal assigned to the path network (any one of 122, 124, 126, . . . , and 128).

The policy determiner 430 performs a function of managing a policy related to the data traffic based on the network status detected by using the network detector 422. An operation of the policy determiner 430 to apply the policy using the overload information by the policy determiner 430 is described below. The policy determiner 430 compares the received transmitter identification information with the overloaded transmitter list to check the terminal 110 is located in the overload area, and generates the policy answer signal including the determined policy based on a result of the check. Although the traffic of the terminal 110 can be suspended by using the policy answer signal with the determination that the terminal 110 is located in the overload area by the policy determiner 430, the present disclosure is not limited to this scheme. Alternatively, the policy provider 140 only transmits the overload area information to the terminal 110, such that the terminal 110 can suspend the traffic by determining whether or not it is located in the overload area based on the information.

A step of using the overload information by the policy determiner 430 is described in detail below. When the result of determination indicates that the terminal 110 is located in the overload area, the policy determiner 430 detects that the network status of the path network (any one of 122, 124, 126, . . . , and 128) is busy, and generates the policy answer signal in which the policy is changed to suspend the upload of the contents stored in the terminal 110 to the content provider 150 via the path network time by the terminal 110 or the download of the non-real-time traffic answer signal corresponding to the non-real-time traffic request signal from the content provider 150 by the terminal 110 for a preset. When the result of the determination indicates that the terminal 110 is not located in the overload area, the policy determiner 430 generates the policy answer signal in which the policy according to the network status is applied. The policy determiner 430 generates the policy answer signal including at least one of the policy request cycle information according to the network status, the threshold value, or the priority information.

A step of generating the policy answer signal corresponding to the policy request signal received from the terminal 110 by the policy determiner 430 is described below. The policy determiner 430 checks the network status in order to generate the policy answer signal, and generates the policy answer signal including at least one of the policy request cycle information according to the network status, the threshold value, or the priority information. The threshold value is information including respective threshold values for a plurality of parameters related to the traffic control. The threshold value is a value that is adaptively set based on at least one piece of information among the number of terminals assigned to the transmitter 210 or 220 in the path network (any one of 122, 124, 126, . . . , and 128), traffic transmission status of each terminal, and transmission request time of each terminal. The threshold value has a value for limiting the number of terminals assigned to each transmitter in the path network (any one of 122, 124, 126, . . . , and 128) within a predetermined range. The priority information has a value that is set to allow the traffic to be transmitted on a priority basis at the most available time or a priority value that is set based on a type of the path network (any one of 122, 124, 126, . . . , and 128). The policy transmitter 440 periodically transmits such a policy answer signal to the terminal 110.

Figure 5:
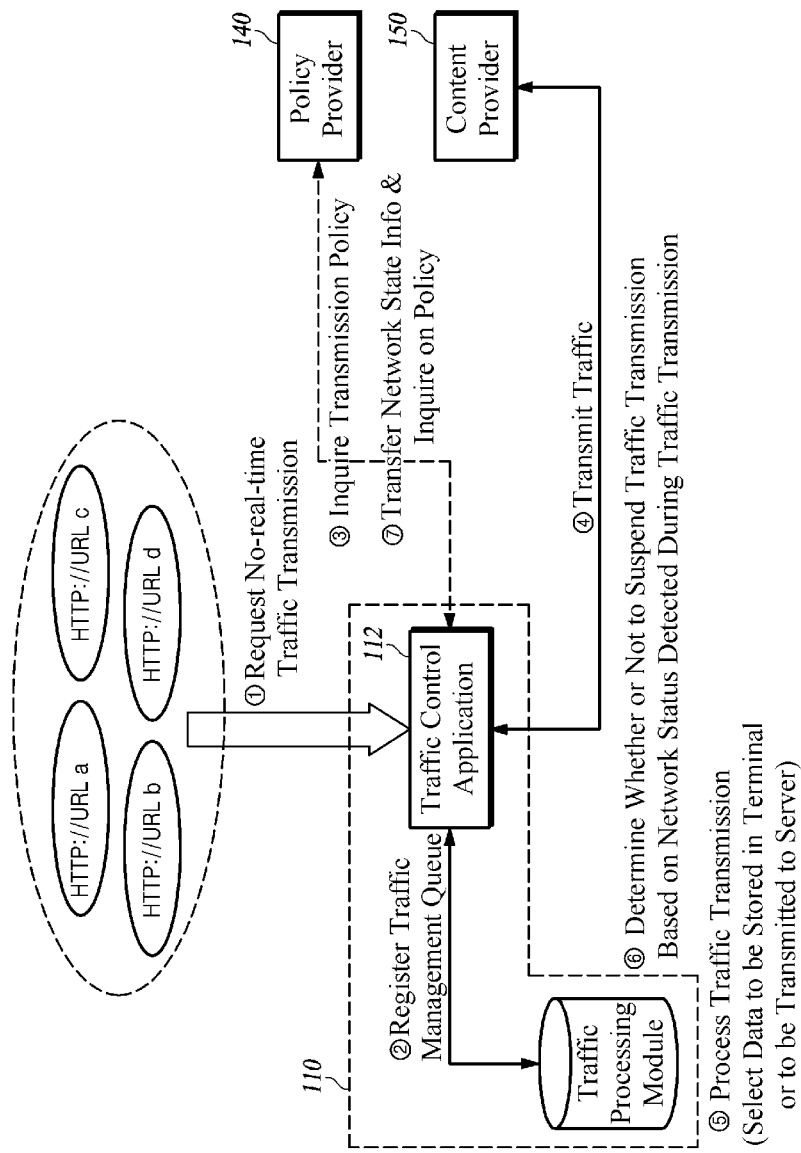
FIG. 5 is a schematic diagram for describing a traffic control method according to at least one embodiment of the present disclosure.

FIG. 5 is a schematic diagram for describing a traffic control method according to at least one first embodiment of the present disclosure.

The traffic control application 112 can be implemented as a program (e.g., computer-related coding scheme(s) or software(s) embedded in a hardware module) that is installed in the terminal 110, detects the network status of the path network (any one of 122, 124, 126, . . . , and 128) via which the terminal 110 performs a communication, and manages adaptive data traffic based on the detected network status. The policy provider 140 detects the network status of each terminal assigned to the path network (any one of 122, 124, 126, . . . , and 128), and determines and manages a policy related to the data traffic based on the detected network status. The content provider 150 is a server that performs contents storage and management of transmitting and receiving the data traffic of the terminal 110. A traffic processing module is a communication processor included in the terminal 110. The traffic processing module shown in FIG. 5 is a sort of communication processing module included in the terminal 110, which performs a function of storing the contents received from the content provider 150 or transmitting the data traffic stored in the terminal 110 to the content provider 150.

'①' shown in FIG. 5 indicates that the terminal 110 generates the non-real-time traffic request signal by a user's selection and operation or a user form inputted at. The terminal 110 generates the non-real-time traffic request signal by the input user's operation or instruction.

'②' shown in FIG. 5 indicates that the traffic control application 112 installed in the terminal 110 manages the generated non-real-time traffic request signal, and adjusts the traffic transmission order according to the priority information based on a sequence or a type of the contents. The terminal 110 is configured to determine the order when transmitting the generated traffic request signal to the content provider 150. In other words, the terminal 110 determines the transmission order of the non-real-time traffic request signal to be transmitted to the content provider 150 according to the priority information based on the sequence of the input user's operation or instruction or the type of the contents. The terminal 110 uploads the contents stored in the terminal 110 to the content provider 150 based on the determined transmission order.

'③' shown in FIG. 5 indicates that the terminal 110 inquires the traffic transmission to the policy provider 140. Thereafter, the policy provider 140 determines a status of the current terminal 110, and replies the policy request cycle and the threshold value related to the traffic control. The terminal 110 transmits the policy request signal to the policy provider 140, and receives the policy answer signal corresponding to the policy request signal. The policy answer signal received by the terminal 110 from the policy provider 140 is a signal including at least one piece of information among the policy request cycle information according to the network status, the threshold value, and the priority information.

ⓐ The policy provider 140 transfers threshold values for a plurality of parameters for determining the traffic transmission control in order to detect the network status. The threshold value is information including respective threshold values for a plurality of parameters related to the traffic control.

ⓑ The threshold value is adaptively adjusted based on the number of terminals located at the transmitter 210 or 220, the traffic transmission status of the terminal, or the transmission request time of the terminal (for example, the threshold value is decreased, if the request time is long past the transmission request time of the terminals located in the corresponding cell). The threshold value is a value that is adaptively set based on at least one piece of information among the number of terminals assigned to the transmitter 210 or 220 in the path network (any one of 122, 124, 126, . . . , and 128), traffic transmission status of each terminal, and transmission request time of each terminal.

ⓒ The policy provider 140 manages the number of traffic transmission terminals per cell, to prevent unnecessary congestion. The threshold value has a value for limiting the number of terminals assigned to each transmitter in the path network (any one of 122, 124, 126, . . . , and 128) within a predetermined range.

ⓓ The policy provider 140 has time (to transmit traffic on a priority basis at the most available time) and network type (to transmit traffic on a priority basis when the network is a WiFi network). The priority information has a value that is set to allow the traffic to be transmitted on a priority basis at the most available time or a priority value that is set based on a type of the path network (any one of 122, 124, 126, . . . , and 128).

'④' shown in FIG. 5 indicates a non-real-time traffic request URL (uniform resource locator), data transmission request to the content provider 150, and transmission. The terminal 110 transmits the non-real-time traffic request signal to the content provider 150 corresponding to the URL.

'⑤' shown in FIG. 5 indicates a download request to the content provider 150 and storage of contents in a storage space according to a type of the contents in the case of the download, and an upload request to the content provider 150 and transmission of the data stored in the terminal to the content provider 150 in the case of the upload. The terminal 110 downloads the non-real-time traffic answer signal corresponding to the non-real-time traffic request signal from the content provider 150 via the path network (any one of 122, 124, 126, . . . , and 128) or uploads the contents stored in the terminal 110 to the content provider 150. The terminal 110 causes the non-real-time traffic answer signal to be downloaded to a predetermined storage area depending on a data type of the non-real-time traffic answer signal.

'⑥' shown in FIG. 5 indicates determination whether or not to control the traffic transmission by detecting the network status when the terminal transmits traffic. The terminal 110 detects the network status of the path network (any one of 122, 124, 126, . . . , and 128) based on the policy answer signal, determines whether or not to control the traffic based on the network status detected at the time of the download or the upload, and controls the download or the upload (traffic) based on the result of the determination.

ⓐ The transmission rate of the download or the upload is compared with the threshold value, and when a result of the comparison indicates that the current transmission rate is below the threshold value, it is determined that the network status is busy, and the traffic transmission is suspended (for example, when threshold value=200 kbps, current download or upload transmission rate <200 kbp, it is determined that the network is in bad condition). The terminal 110 compares the transmission rate at the time of the download or the upload with the threshold value, and when a result of the comparison indicates that the transmission rate is below the threshold value, detects that the network status is busy and suspends the download or the upload (traffic).

ⓑ When main quality indexes of an RF layer and a physical layer with respect to Rx and Tx of the terminal 110 are below the threshold value, it is determined that the network status is bad, and the traffic transmission is suspended (for example, when a value of Ec/Io is low, it is determined that the wireless condition of the download is bad, when a value of a Tx head room is low, it is determined that the wireless condition of the upload is bad). When the main quality indexes of Rx and Tx among the parameters related to the traffic control included in the policy answer signal are below the threshold value, the terminal 110 detects that the network status is busy, suspends the download or the upload (traffic).

ⓒ When a distance between the terminal 110 and the transmitter 210 or 220 is relatively long, the traffic transmission is suspended for the resource efficiency of the network (for example, an MCS (modulation coding scheme) level is determined, and when a result of the determination indicates that the level is low, it is determined that the distance between the transmitter 201 or 220 and the terminal 110 is long, and then it is determined that the network status is bad). When the distance between the terminal assigned to the transmitter 210 or 220 in the path network (any one of 122, 124, 126, . . . , and 128) and the transmitter 210 or 220 exceeds a predetermined distance, the terminal 110 suspends the download or the upload (traffic) for a resource efficiency of the path network (any one of 122, 124, 126, . . . , and 128).

ⓓ The traffic transmission is controlled depending on the status of the terminal (for example, the transmission is suspended when a battery level is lower than the threshold value, when the temperature of the terminal 110 is high, or the like). When the battery level is lower than the threshold value or the temperature of the terminal exceeds the threshold value, the terminal 110 suspends the download or the upload (traffic).

'⑦' shown in FIG. 5 indicates that information on whether or not to control the network is transmitted to the policy provider 140 based on the threshold value transmitted by the policy provider 140 according to the network status and the policy inquiry cycle. The terminal 110 transmits the policy request signal to the policy provider 140 based on the policy request cycle information included in the policy answer signal.

Thereafter, '⑧' indicates that the policy provider 140 performs a retry of the traffic transmission based on the transmitted policy (policy answer signal) to repeat steps of '③' to '⑦'. A step of retrying the suspended non-real-time traffic by the terminal 110 is described. The terminal 110 operates to repeat the retry of the download or the upload based on the policy answer signal.

ⓐ Retry after expiry of a timer: The traffic transmission is retried when a predetermined standby time (transmitted by the policy provider 140) elapses after the suspension of the traffic transmission. The terminal 110 performs the retry of the download or the upload (traffic) when the preset time of the timer elapses.

ⓑ Retry following a network modem switch: The retry of the traffic transmission is performed when the network modem is switched to other one such as the wireless LAN network 126, the 3G network 122, and the 4G network 124. The terminal 110 performs the retry of the download or the upload (traffic) when the path network (any one of 122, 124, 126, . . . , and 128) is switched to other network.

ⓒ Retry when a new non-real-time traffic transmission is requested: The retry of the traffic transmission is performed when a non-real-time traffic transmission is added by selection and operation of a user or a form of a user.

Figure 6:
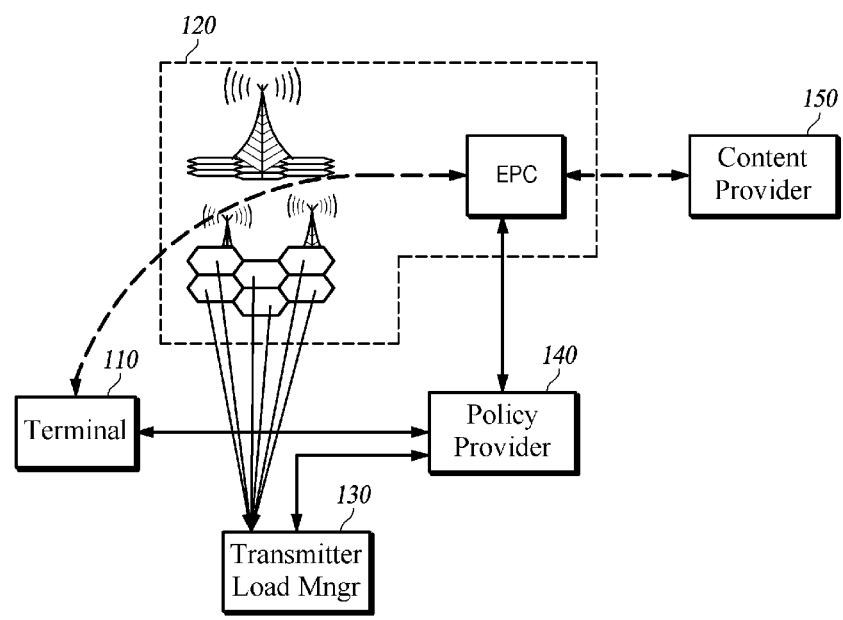
FIG. 6 is a schematic diagram of an example of an adaptive non-real-time traffic control system using overload information according to at least one second embodiment of the present disclosure.

FIG. 6 is a schematic diagram of an example of an adaptive non-real-time traffic control system using overload information according to at least one second embodiment among exemplary embodiments of the present disclosure.

As shown in FIG. 6, without the terminal 110 estimating a usable bandwidth of the network 120 or measuring the network quality in order to estimate the congestion status of the current transmitter in the network 120, the policy provider 140 acquires the information of the transmitter load manager 130, to enable the traffic to be controlled on a non-real-time basis by using the information of the transmitter load manager 130 at the time of determining the policy. When an area where the terminal 110 is located is an overload area, there will be no traffic transmission, and after standing by for a predetermined time, it renders the policy to be inquired to the policy provider 140. When the area where the terminal 110 is located is not an overload area, the terminal 110 recognizes the congestion based on the policy responded from the policy provider 140, and operates the service.

In general, measurement time is required in order for the terminal 110 to generate traffic to figure out the network status or to separately estimate the network status, and unnecessary time and traffic are required to detect idleness capacity and to determine congestion status. However, in the at least one second embodiment, the unnecessary measurement overhead and time are reduced by using the cell load information acquired by the transmitter load manager 130, and hence the influence on the network can be minimized at the time of the related service operation. A step of controlling the non-real-time traffic by using the overload information by the terminal 110, the policy provider 140, and the content provider 150, which are constituent elements shown in FIG. 6, is described below. The terminal 110 performs an adaptive traffic control by receiving the policy answer signal from the policy provider 140 that checks the network status of the path network (any one of 122, 124, 126, . . . , and 128) via which a communication is performed.

① The policy provider 140 periodically receives a cell ID (identification information) list on the overloaded transmitters from the transmitter load manager 130. The policy provider 140 receives the overloaded transmitter list from the transmitter load manager 130. The transmitter load manager 130 collects transmitter identification information (for example, cell ID) received from the interlocking transmitter 210 or 220 to generate the transmitter identification list, and selects an overloaded transmitter from the transmitter identification list by using the output value received from the transmitter 210 or 220 to generate the overloaded transmitter list.

② The terminal 110 inquires a policy to be used by the current terminal 110 to the policy provider 140 with the cell ID of the transmitter where the terminal 110 is located at the time of inquiring the policy. The terminal 110 transmits the policy request signal including the network identification information on the path network (any one of 122, 124, 126, . . . , and 128) via which a communication is performed to the policy provider 140. The policy provider 140 receives the policy request signal including the transmitter identification information on the path network (any one of 122, 124, 126, . . . , and 128) via which a communication is performed from the terminal 110.

③ The policy provider 140 compares the cell ID included in the policy request signal form the terminal 110 with the overloaded transmitter list, and when a result of the comparison indicates that the terminal 110 is located in the overload area, replies a policy to re-inquire the policy after a predetermined time or to suspend the traffic (contents providing service). The policy provider 140 compares the received transmitter identification information with the overloaded transmitter list to check if the terminal 110 is located in the overload area, generates the policy answer signal including the policy determined based on a result of the check, and transmits the generated policy answer signal to the terminal 110. When the result of the check indicates that the terminal 110 is located in the overload area, the policy provider 140 detects that the network status of the path network (any one of 122, 124, 126, . . . , and 128) is busy, and generates the policy answer signal in which the policy is changed to suspend the upload of the contents stored in the terminal 110 to the content provider 150 via the path network by the terminal 110 or the download of the non-real-time traffic answer signal corresponding to the non-real-time traffic request signal from the content provider 150 by the terminal 110 for a preset time.

④ When the area where the terminal 110 is located is an overload area by using the response from the policy provider 140, the terminal 110 stands by for a predetermined time without transmitting the traffic (contents providing service), and then re-inquires the policy. When the result of checking the overload area information included in the policy answer signal indicates that the transmitter identification information on the path network (any one of 122, 124, 126, . . . , and 128) via which a communication is performed is included in the overload area information, the terminal 110 detects that the network status is busy, and suspends the download or the upload (traffic) for a predetermined time. Thereafter, the terminal 110 re-transmits the policy request signal based on the policy request cycle information included in the policy answer signal.

⑤ When the result of the check indicates that the area is not an overload area, the terminal 110 recognizes the congestion based on the policy responded from the policy provider 140, and operates the service. When the result of the check indicates that the terminal 110 is not located in the overload area, the policy provider 140 generates the policy answer signal applied with the policy based on the network status. The terminal 110 determines whether or not to control the traffic based on the network status of the path network (any one of 122, 124, 126, . . . , and 128) detected at the time of the download or the upload, and controls the download or the upload (traffic) based on the result of the determination.

Figure 7:
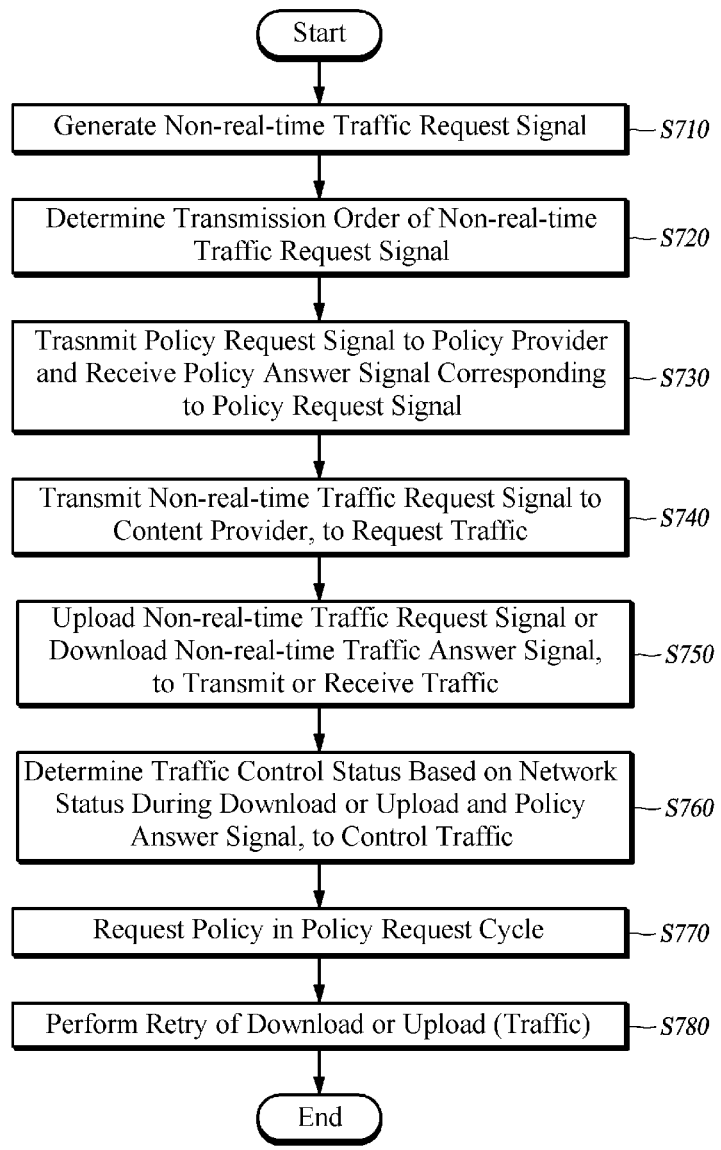
FIG. 7 is a flowchart of an adaptive non-real-time traffic control method according to at least one first embodiment of the present disclosure.

FIG. 7 is a flowchart of process procedure for an adaptive non-real-time traffic control method according to at least one first embodiment among exemplary embodiments of the present disclosure.

The terminal 110 generates the non-real-time traffic request signal by an operation or an instruction inputted by a user (S710). The terminal 110 is configured to determine a transmission order when transmitting generated traffic request signals to the content provider 150. The terminal 110 determines the transmission order of the non-real-time traffic request signals to be transmitted to the content provider 150 based on an operation or instruction sequence inputted by the user or the priority information based on a type of the contents.

The terminal 110 transmits the policy request signal to the policy provider 140, and receives the policy answer signal corresponding to the policy request signal (S730). At step S730, the policy answer signal received by the terminal 110 from the policy provider 140 is a signal including at least one of the policy request cycle information according to the network status, the threshold value, or the priority information. The threshold value is information including respective threshold values for a plurality of parameters related to the traffic control. The threshold value is a value that is adaptively set based on at least one piece of information among the number of terminals assigned to the transmitter 210 or 220 in the path network (any one of 122, 124, 126, . . . , and 128), traffic transmission status of each terminal, and transmission request time of each terminal. The threshold value has a value for limiting the number of terminals assigned to each transmitter in the path network (any one of 122, 124, 126, . . . , and 128) within a predetermined range. The priority information has a value that is set to allow the traffic to be transmitted on a priority basis at the most available time or a priority value that is set based on a type of the path network (any one of 122, 124, 126, . . . , and 128). The traffic parameters include Rx, Tx, Ec/Io, transmission rate, the number of assigned terminals, and the like.

The terminal 110 transmits the non-real-time traffic request signal to the content provider 150 based on the determined transmission order (S740). The terminal 110 downloads the non-real-time traffic answer signal from the content provider 150 corresponding to the non-real-time traffic request signal via the path network (any one of 122, 124, 126, . . . , and 128) or uploads the contents stored in the terminal 110 to the content provider 150 (S750). When downloading the non-real-time traffic answer signal from the content provider 150 at Step S750, the terminal 110 causes the non-real-time traffic answer signal to be downloaded to a predetermined storage area depending on a data type of the non-real-time traffic answer signal.

The terminal 110 detects the network status of the path network (any one of 122, 124, 126, . . . , and 128) based on the policy answer signal, determines whether or not to control the traffic based on the network status detected at the time of the download or the upload, and controls the download or the upload (traffic) based on the result of the determination (S760). At Step S760, the terminal 110 compares the transmission rate at the time of the download or the upload with the threshold value included in the policy answer signal, and when a result of the comparison indicates that the transmission rate is below the threshold value, detects that the network status is busy and suspends the download or the upload (traffic). When main quality indexes of Rx and Tx among the parameters related to the traffic control included in the policy answer signal are below the threshold value, the terminal 110 detects that the network status is busy, and performs a control to suspend the download or the upload (traffic). When a distance between a terminal assigned to the transmitter 210 or 220 in the path network (any one of 122, 124, 126, . . . , and 128) and the transmitter 210 or 220 exceeds a predetermined distance, the terminal 110 suspends the download or the upload (traffic) for a resource efficiency of the path network (any one of 122, 124, 126, . . . , and 128). When a battery level of the terminal is below the threshold value or a temperature of the terminal exceeds the threshold value, the terminal 110 suspends the download or the upload (traffic).

The terminal 110 transmits the policy request signal to the policy provider 140 based on the policy request cycle information included in the policy answer signal (S770). The terminal 110 is configured to retry the suspended non-real-time traffic. The terminal 110 operates to cause the retry of the download or the upload (traffic) to be repeatedly performed based on the policy answer signal (S780). At Step S780, the terminal 110 performs the retry of the download or the upload (traffic) when a time of a timer elapses. When the path network (any one of 122, 124, 126, . . . , and 128) is switched to other network, the terminal 110 performs the retry of the download or the upload (traffic). When a new non-real-time traffic request signal is received, the terminal 110 performs the retry of the download or the upload (traffic).

Although it is described that Steps S710 to S780 are sequentially performed in FIG. 7, the present disclosure is not limited to this scheme. As the steps in FIG. 7 can be applied in a manner that the steps are appropriately modified or two or more steps are performed in parallel, the steps in FIG. 7 are not limited to the time sequential manner.

Figure 8:
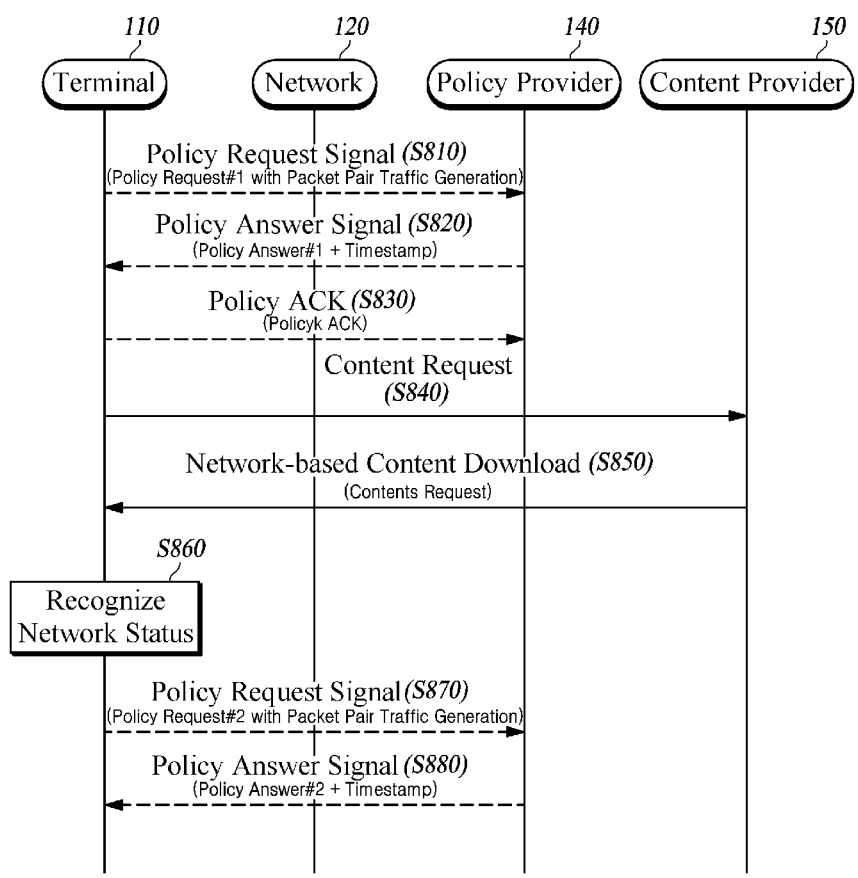
FIG. 8 is a flowchart of a policy management method according to at least one first embodiment of the present disclosure.

FIG. 8 is a flowchart of process procedure for a policy management method according to at least one first embodiment among exemplary embodiments of the present disclosure.

The terminal 110 transmits the policy request signal to the policy provider 140 via the network 120 (S810). At Step S810, the terminal 110 is configured to determine a transmission order when transmitting generated traffic request signals to the content provider 150. The terminal 110 determines the transmission order of the non-real-time traffic request signals to be transmitted to the content provider 150 based on an operation or instruction sequence inputted by the user or the priority information based on a type of the contents. Thereafter, the terminal 110 transmits the non-real-time traffic request signal to the content provider 150 based on the determined transmission order.

The terminal 110 receives the policy answer signal corresponding to the policy request signal from the policy provider 140 via the network 120 (S820). At Step S820, the policy provider 140 checks the network status in order to generate the policy answer signal, and generates the policy answer signal including at least one of the policy request cycle information according to the network status, the threshold value, or the priority information. The threshold value is information including respective threshold values for a plurality of parameters related to the traffic control. The threshold value is a value that is adaptively set based on at least one piece of information among the number of terminals assigned to the transmitter 210 or 220 in the path network (any one of 122, 124, 126, . . . , and 128), traffic transmission status of each terminal, and transmission request time of each terminal. The threshold value has a value for limiting the number of terminals assigned to each transmitter in the path network (any one of 122, 124, 126, . . . , and 128) within a predetermined range. The priority information has a value that is set to allow the traffic to be transmitted on a priority basis at the most available time or a priority value that is set based on a type of the path network (any one of 122, 124, 126, . . . , and 128). The policy provider 140 periodically transmits such a policy answer signal to the terminal 110.

Upon receiving the policy answer signal from the policy provider 140, the terminal 110 transmits a policy ACK indicating completion of the reception of the policy answer signal to the policy provider 140 via the network 120 (S830). Thereafter, the terminal 110 transmits the non-real-time traffic request signal to the content provider 150 via the network 120 (S840). The terminal 110 downloads the non-real-time traffic answer signal corresponding to the non-real-time traffic request signal from the content provider 150 or uploads the contents stored in the terminal 110 to the content provider 150 via the network 120 (S850). At Step S850, the terminal 110 is configured to determine the order when transmitting the generated traffic request signal to the content provider 150. The terminal 110 determines the transmission order of the non-real-time traffic request signal to be transmitted to the content provider 150 according to the priority information based on the sequence of the input user's operation or instruction or the type of the contents, and transmits the non-real-time traffic request signal to the content provider 150 based on the determined transmission order.

The terminal 110 detects the network status of the network 120 at the time of the download or the upload (S860). At Step S860, the terminal 110 determines whether or not to control the traffic based on the network status of the path network (any one of 122, 124, 126, . . . , and 128) detected at the time of the download or the upload, and controls the download or the upload (traffic) based on the result of the determination. The terminal 110 compares the transmission rate at the time of the download or the upload with the threshold value included in the policy answer signal, when the transmission rate is below the threshold value, detects that the network status is busy, and suspends the download or the upload (traffic). When main quality indexes of Rx and Tx among the parameters related to the traffic control included in the policy answer signal are below the threshold value, the terminal 110 detects that the network status is busy, and suspends the download or the upload (traffic). When a distance between a terminal assigned to the transmitter 210 or 220 in the path network (any one of 122, 124, 126, . . . , and 128) and the transmitter 210 or 220 exceeds a predetermined distance, the terminal 110 suspends the download or the upload (traffic) for a resource efficiency of the path network (any one of 122, 124, 126, . . . , and 128). When a battery level of the terminal is below the threshold value or a temperature of the terminal exceeds the threshold value, the terminal 110 suspends the download or the upload (traffic).

The terminal 110 transmits the policy request signal to the policy provider 140 based on the policy request cycle information included in the policy answer signal (S870). The terminal 110 receives the policy answer signal corresponding to the policy request signal from the policy provider 140 via the network 120 (S880). At Step S880, the policy provider 140 checks the network status in order to generate the policy answer signal, and generates the policy answer signal including at least one of the policy request cycle information according to the network status, the threshold value, or the priority information.

Although it is described that Steps S810 to S880 are sequentially performed in FIG. 8, the present disclosure is not limited to this scheme. As the steps in FIG. 8 can be applied in a manner that the steps are appropriately modified or two or more steps are performed in parallel, the steps in FIG. 8 are not limited to the time sequential manner.

Figure 9:
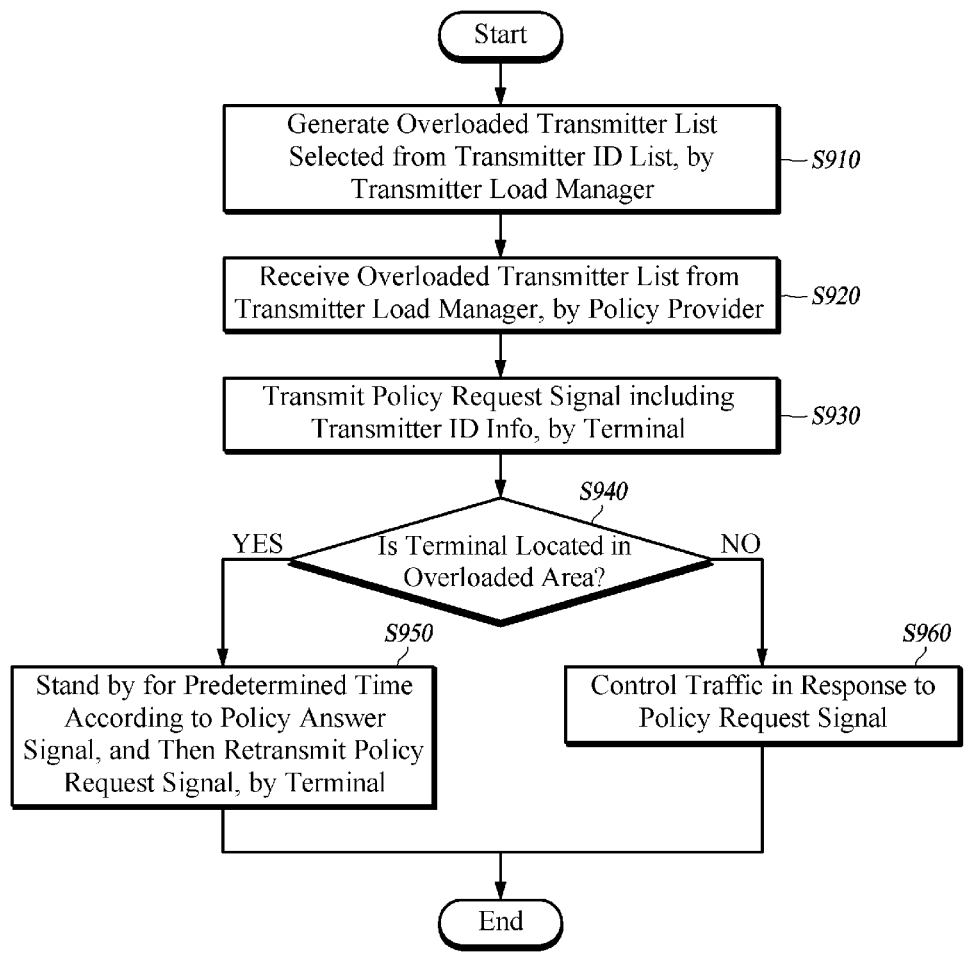
FIG. 9 is a flowchart of an adaptive non-real-time traffic control method using overload information according to at least one second embodiment of the present disclosure.

FIG. 9 is a flowchart of process procedure for an adaptive non-real-time traffic control method using overload information according to at least one second embodiment among exemplary embodiments of the present disclosure.

The transmitter load manager 130 collects transmitter identification information (for example, cell ID) received from the interlocking transmitter 210 or 220 to generate a transmitter identification list, and selects an overloaded transmitter from the transmitter identification list by using the output value received from the transmitter 210 or 220 to generate an overloaded transmitter list (S910). The policy provider 140 receives the overloaded transmitter list from the transmitter load manager 130 (S920).

The terminal 110 generates the non-real-time traffic request signal by an operation or an instruction inputted by a user, and transmits the policy request signal including the network identification information on the path network (any one of 122, 124, 126, . . . , and 128) via which a communication is performed to the policy provider 140 (S930). The policy provider 140 receives the policy request signal including the transmitter identification information on the path network (any one of 122, 124, 126, . . . , and 128) via which a communication is performed from the terminal 110.

The policy provider 140 compares the received transmitter identification information with the overloaded transmitter list, to check if the terminal 110 is located in the overload area (S940). When a result of the check at Step S940 indicates that the terminal 110 is located in the overload area, the policy provider 140 detects that the network status of the path network (any one of 122, 124, 126, . . . , and 128) is busy, and generates the policy answer signal in which the policy is changed to suspend the upload of the contents stored in the terminal 110 to the content provider 150 via the path network by the terminal 110 or the download of the non-real-time traffic answer signal corresponding to the non-real-time traffic request signal from the content provider 150 by the terminal 110 for a preset time. The terminal 110 detects that the network status is busy based on the policy answer signal, and suspends the download or the upload (traffic) for a predetermined time (S950).

When the result of the check at Step S940 indicates that the terminal 110 is not located in the overload area, the policy provider 140 generates the policy answer signal applied with the policy based on the network status (S960). The policy provider 140 generates the policy answer signal including at least one of the policy request cycle information according to the network status, the threshold value, or the priority information. The terminal 110 receives the policy answer signal including the overload area information in response to the policy request signal from the policy provider 140. The terminal 110 downloads the non-real-time traffic answer signal corresponding to the non-real-time traffic request signal from the content provider 150 via the path network (any one of 122, 124, 126, . . . , and 128) or uploads the contents stored in the terminal 110 to the content provider 150. The terminal 110 controls the download or the upload (traffic) based on the overload area information included in the policy answer signal at the time of the download or the upload.

Although it is described that Steps S910 to S960 are sequentially performed in FIG. 9, the present disclosure is not limited to this scheme. As the steps in FIG. 9 can be applied in a manner that the steps are appropriately modified or two or more steps are performed in parallel, the steps in FIG. 9 are not limited to the time sequential manner.

Figure 10:
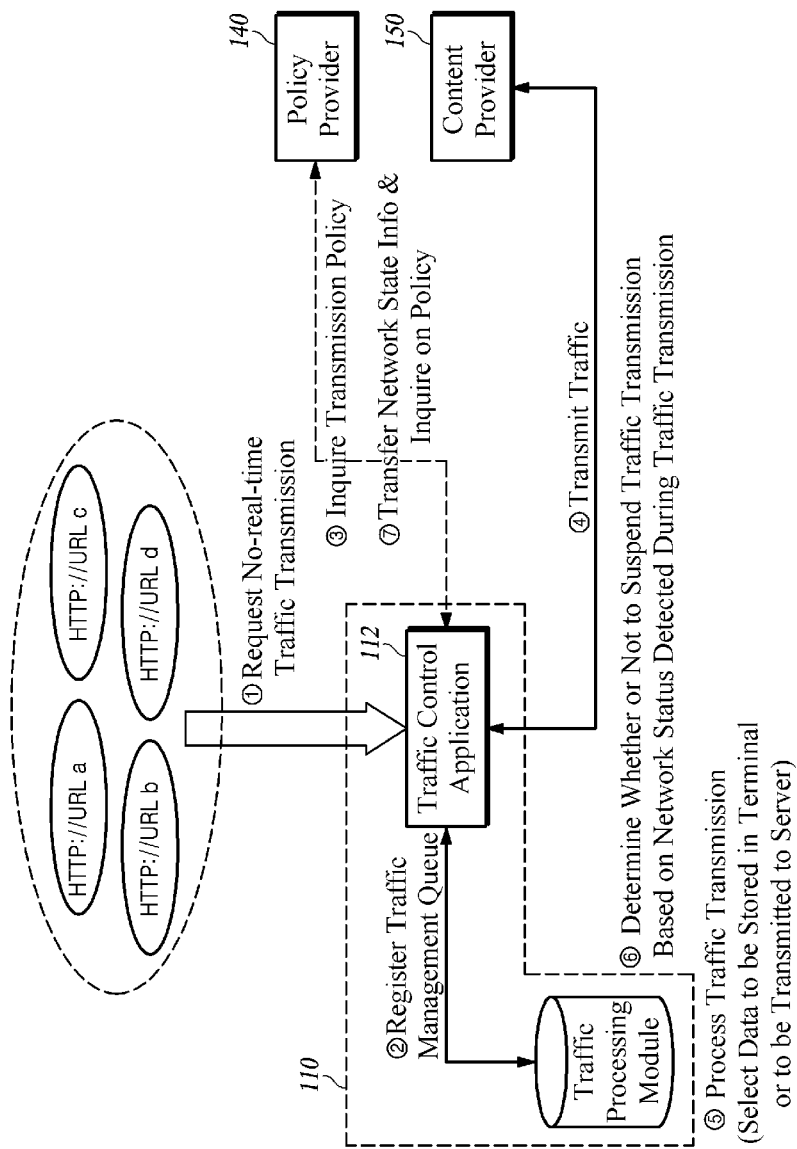
FIG. 10 is a schematic diagram for describing a traffic control method according to at least one second embodiment of the present disclosure.

FIG. 10 is a schematic diagram for describing a traffic control method according to at least one second embodiment among exemplary embodiments of the present disclosure.

The traffic control application 112 is a sort of program that is installed in the terminal 110, detects the network status of the path network (any one of 122, 124, 126, . . . , and 128) via which the terminal 110 performs a communication, and manages adaptive data traffic based on the detected network status. The policy provider 140 detects the network status of each terminal assigned to the path network (any one of 122, 124, 126, . . . , and 128), and determines and manages a policy related to the data traffic based on the detected network status. The content provider 150 is a sort of server that performs contents storage and management of transmitting and receiving the data traffic of the terminal 110. A traffic processing module is a communication processor included in the terminal 110. The traffic processing module shown in FIG. 10 is a sort of communication processing module included in the terminal 110, which performs a function of storing the contents received from the content provider 150 or transmitting the data traffic stored in the terminal 110 to the content provider 150.

'①' shown in FIG. 10 indicates that the terminal 110 generates the non-real-time traffic request signal by a user's selection and operation or a user form inputted at. The terminal 110 generates the non-real-time traffic request signal by the input user's operation or instruction.

'②' shown in FIG. 10 indicates that the traffic control application 112 installed in the terminal 110 manages the generated non-real-time traffic request signal, and adjusts the traffic transmission order according to the priority information based on a sequence or a type of the contents. The terminal 110 is configured to determine the order when transmitting the generated traffic request signal to the content provider 150. In other words, the terminal 110 determines the transmission order of the non-real-time traffic request signal to be transmitted to the content provider 150 according to the priority information based on the sequence of the input user's operation or instruction or the type of the contents. The terminal 110 transmits the non-real-time traffic request signal to the content provider 150 based on the determined transmission order.

'③' shown in FIG. 10 indicates that the terminal 110 inquires the traffic transmission to the policy provider 140. Thereafter, the policy provider 140 determines a status of the current terminal 110, and replies the policy request cycle and the threshold value related to the traffic control. The terminal 110 transmits the policy request signal to the policy provider 140, and receives the policy answer signal corresponding to the policy request signal. The policy answer signal received by the terminal 110 from the policy provider 140 is a signal including at least one piece of information among the policy request cycle information according to the network status, the threshold value, and the priority information.

ⓐ The policy provider 140 transfers threshold values for a plurality of parameters for determining the traffic transmission control in order to detect the network status. The threshold value is information including respective threshold values for a plurality of parameters related to the traffic control.

ⓑ Here, the threshold value is adaptively adjusted based on the number of terminals located at the transmitter 210 or 220, the traffic transmission status of the terminal, or the transmission request time of the terminal (for example, the threshold value is decreased, if the request time is long past the transmission request time of the terminals located in the corresponding cell). The threshold value is a value that is adaptively set based on at least one piece of information among the number of terminals assigned to the transmitter 210 or 220 in the path network (any one of 122, 124, 126, . . . , and 128), traffic transmission status of each terminal, and transmission request time of each terminal.

ⓒ The policy provider 140 manages the number of traffic transmission terminals per cell, to prevent unnecessary congestion. The threshold value has a value for limiting the number of terminals assigned to each transmitter in the path network (any one of 122, 124, 126, . . . , and 128) within a predetermined range.

ⓓ The policy provider 140 has time (to transmit traffic on a priority basis at the most available time) and network type (to transmit traffic on a priority basis when the network is, for example, a WiFi network). The priority information has a value that is set to allow the traffic to be transmitted on a priority basis at the most available time or a priority value that is set based on a type of the path network (any one of 122, 124, 126, . . . , and 128).

'④' shown in FIG. 10 indicates a non-real-time traffic request URL (uniform resource locator), data transmission request to the content provider 150, and transmission. The terminal 110 transmits the non-real-time traffic request signal to the content provider 150 corresponding to the URL.

'⑤' shown in FIG. 10 indicates a download request to the content provider 150 and storage of contents in a storage space according to a type of the contents in the case of the download, and an upload request to the content provider 150 and transmission of the data stored in the terminal to the content provider 150 in the case of the upload. Here, the terminal 110 downloads the non-real-time traffic answer signal corresponding to the non-real-time traffic request signal from the content provider 150 via the path network (any one of 122, 124, 126, . . . , and 128) or uploads the contents stored in the terminal 110 to the content provider 150. The terminal 110 causes the non-real-time traffic answer signal to be downloaded to a predetermined storage area depending on a data type of the non-real-time traffic answer signal.

'⑥' shown in FIG. 10 indicates determination whether or not to control the traffic transmission by detecting the network status when the terminal transmits traffic. The terminal 110 detects the network status of the path network (any one of 122, 124, 126, . . . , and 128) based on the policy answer signal, determines whether or not to control the traffic based on the network status detected at the time of the download or the upload, and controls the download or the upload (traffic) based on the result of the determination.

ⓐ The transmission rate of the download or the upload is compared with the threshold value, and when a result of the comparison indicates that the current transmission rate is below the threshold value, it is determined that the network status is busy, and the traffic transmission is suspended (for example, when threshold value=200 kbps, current download or upload transmission rate <200 kbp, it is determined that the network status is bad). The terminal 110 compares the transmission rate at the time of the download or the upload with the threshold value, and when a result of the comparison indicates that the transmission rate is below the threshold value, detects that the network status is busy and suspends the download or the upload (traffic).

ⓑ When main quality indexes of an RF layer and a physical layer with respect to Rx and Tx of the terminal 110 are below the threshold value, it is determined that the network status is bad, and the traffic transmission is suspended (for example, when a value of Ec/lo is low, it is determined that the wireless condition of the download is bad, when a value of a Tx head room is low, it is determined that the wireless condition of the upload is bad). When the main quality indexes of Rx and Tx among the parameters related to the traffic control included in the policy answer signal are below the threshold value, the terminal 110 detects that the network status is busy, suspends the download or the upload (traffic).

ⓒ When a distance between the terminal 110 and the transmitter 210 or 220 is relatively long, the traffic transmission is suspended for the resource efficiency of the network (for example, an MCS (modulation coding scheme) level is determined, and when a result of the determination indicates that the level is low, it is determined that the distance between the transmitter 201 or 220 and the terminal 110 is long, and then it is determined that the network status is bad). When the distance between the terminal assigned to the transmitter 210 or 220 in the path network (any one of 122, 124, 126, . . . , and 128) and the transmitter 210 or 220 exceeds a predetermined distance, the terminal 110 suspends the download or the upload (traffic) for a resource efficiency of the path network (any one of 122, 124, 126, . . . , and 128).

ⓓ The traffic transmission is controlled depending on the status of the terminal (for example, the transmission is suspended when a battery level is lower than the threshold value, when the temperature of the terminal 110 is high, or the like). When the battery level is lower than the threshold value or the temperature of the terminal exceeds the threshold value, the terminal 110 suspends the download or the upload (traffic).

'⑦' shown in FIG. 10 indicates that information on whether or not to control the network is transmitted to the policy provider 140 based on the threshold value transmitted by the policy provider 140 according to the network status and the policy inquiry cycle. The terminal 110 transmits the policy request signal to the policy provider 140 based on the policy request cycle information included in the policy answer signal.

Thereafter, '⑧' indicates that the policy provider 140 performs a retry of the traffic transmission based on the transmitted policy (policy answer signal) to repeat steps of '③' to '⑦'. A step of retrying the suspended non-real-time traffic by the terminal 110 is described. The terminal 110 operates to repeat the retry of the download or the upload based on the policy answer signal.

ⓐ Retry after expiry of a timer: The traffic transmission is retried when a predetermined standby time (transmitted by the policy provider 140) elapses after the suspension of the traffic transmission. The terminal 110 performs the retry of the download or the upload (traffic) when the preset time of the timer elapses.

ⓑ Retry following a network modem switch: The retry of the traffic transmission is performed when the network modem is switched to other one such as the wireless LAN network 126, the 3G network 122, and the 4G network 124. The terminal 110 performs the retry of the download or the upload (traffic) when the path network (any one of 122, 124, 126, . . . , and 128) is switched to other network.

ⓒ Retry when a new non-real-time traffic transmission is requested: The retry of the traffic transmission is performed when a non-real-time traffic transmission is added by selection and operation of a user or a form of a user.

Figure 11:
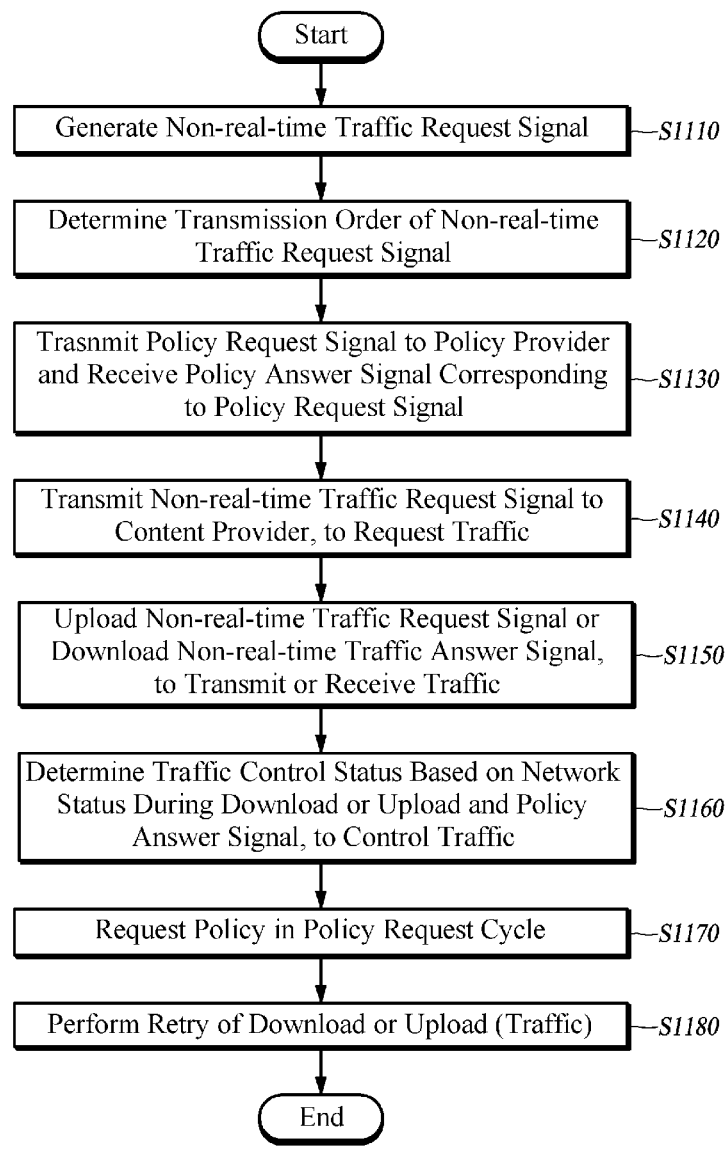
FIG. 11 is a flowchart of the adaptive non-real-time traffic control method according to at least one second embodiment of the present disclosure.

FIG. 11 is a flowchart of process procedure for an adaptive non-real-time traffic control method according to at least one second embodiment among exemplary embodiments of the present disclosure.

The terminal 110 generates the non-real-time traffic request signal by an operation of an instruction inputted by a user (S1110). When transmitting the generated traffic request signal to the content provider 150, the terminal 110 is configured to determine a transmission order. The terminal 110 determines the transmission order of the non-real-time traffic request signal to be transmitted to the content provider 150 based on an operation or instruction sequence inputted by a user or a type of contents (S1120).

The terminal 110 transmits the policy request signal to the policy provider 140, and receives the policy answer signal corresponding to the policy request signal (S1130). At Step S1130, the policy answer signal received by the terminal 110 from the policy provider 140 is a signal including at least one piece of information among the policy request cycle information according to the network status, the threshold value, and the priority information. The threshold value is information including respective threshold values for a plurality of parameters related to the traffic control. The threshold value is a value that is adaptively set based on at least one piece of information among the number of terminals assigned to the transmitter 210 or 220 in the path network (any one of 122, 124, 126, . . . , and 128), traffic transmission status of each terminal, and transmission request time of each terminal. The threshold value has a value for limiting the number of terminals assigned to each transmitter in the path network (any one of 122, 124, 126, . . . , and 128) within a predetermined range. The priority information has a value that is set to allow the traffic to be transmitted on a priority basis at the most available time (time of a day with the smallest number of calls generated) or a priority value that is set based on a type of the path network (any one of 122, 124, 126, . . . , and 128). The traffic parameter includes Rx, Tx, Ec/lo, transmission rate, the number of assigned terminals, and the like.

The terminal 110 transmits the non-real-time traffic request signal to the content provider 150 based on the determined transmission order (S1140). The terminal 110 downloads the non-real-time traffic answer signal corresponding to the non-real-time traffic request signal from the content provider 150 via the path network (any one of 122, 124, 126, . . . , and 128) or uploads the contents stored in the terminal 110 to the content provider 150 (S1150). When downloading the non-real-time traffic answer signal from the content provider 150 at Step S1150, the terminal 110 causes the non-real-time traffic answer signal to be downloaded to a predetermined storage area depending on a data type of the non-real-time traffic answer signal.

The terminal 110 detects the network status of the path network (any one of 122, 124, 126, . . . , and 128) based on the policy answer signal, determines whether or not to control the traffic based on the network status detected at the time of the download or the upload, and controls the download or the upload (traffic) based on the result of the determination (S1160). At Step S1160, the terminal 110 compares the transmission rate at the time of the download or the upload with the threshold value included in the policy answer signal, and when a result of the comparison indicates that the transmission rate is below the threshold value, detects that the network status is busy and suspends the download or the upload (traffic). When main quality indexes of Rx and Tx among the parameters related to the traffic control included in the policy answer signal are below the threshold value, the terminal 110 detects that the network status is busy, and performs a control to suspend the download or the upload (traffic). When a distance between a terminal assigned to the transmitter 210 or 220 in the path network (any one of 122, 124, 126, . . . , and 128) and the transmitter 210 or 220 exceeds a predetermined distance, the terminal 110 suspends the download or the upload (traffic) for a resource efficiency of the path network (any one of 122, 124, 126, . . . , and 128). When a battery level of the terminal is below the threshold value or a temperature of the terminal exceeds the threshold value, the terminal 110 suspends the download or the upload (traffic).

The terminal 110 transmits the policy request signal to the policy provider 140 based on the policy request cycle information included in the policy answer signal (S1170). The terminal 110 is configured to retry the suspended non-real-time traffic. The terminal 110 operates to cause the retry of the download or the upload (traffic) to be repeatedly performed based on the policy answer signal (S1180). At Step S1180, the terminal 110 performs the retry of the download or the upload (traffic) when a time of a timer elapses. When the path network (any one of 122, 124, 126, . . . , and 128) is switched to other network, the terminal 110 performs the retry of the download or the upload (traffic). When a new non-real-time traffic request signal is received, the terminal 110 performs the retry of the download or the upload (traffic).

Although it is described that Steps S1110 to S1180 are sequentially performed in FIG. 11, the present disclosure is not limited to this scheme. As the steps in FIG. 11 can be applied in a manner that the steps are appropriately modified or two or more steps are performed in parallel, the steps in FIG. 11 are not limited to the time sequential manner.

Figure 12:
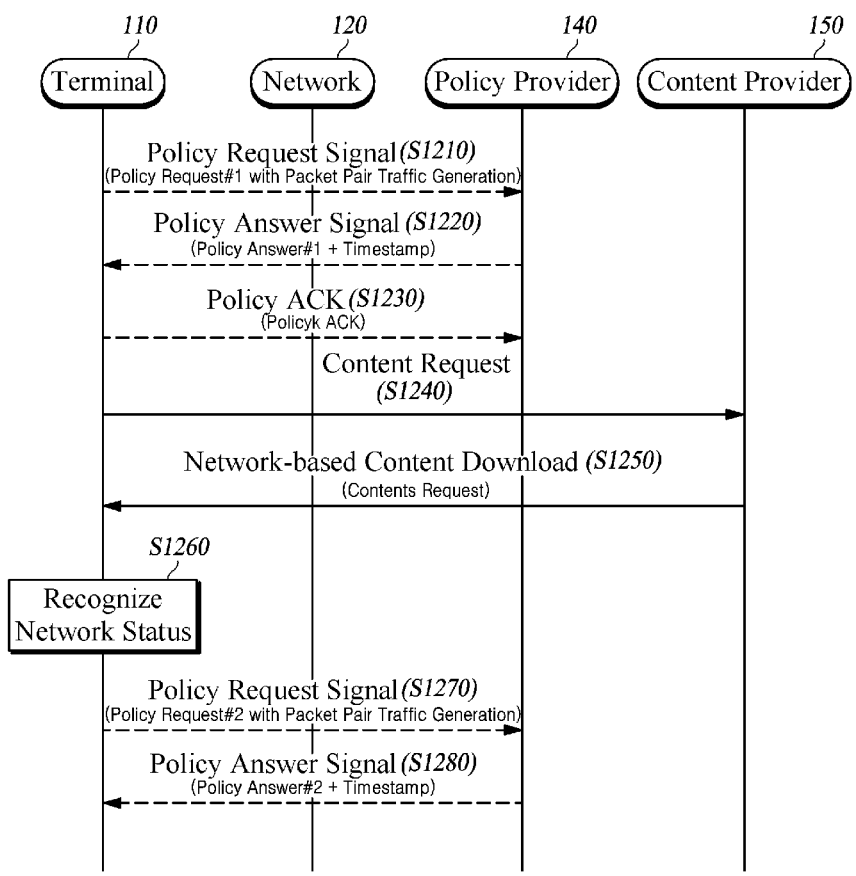
FIG. 12 is a flowchart of a policy management method according to at least one second embodiment of the present disclosure.

FIG. 12 is a flowchart of the policy management method according to at least one second embodiment among exemplary embodiments of the present disclosure.

The terminal 110 transmits the policy request signal to the policy provider 140 via the network 120 (S1210). At Step S1210, the terminal 110 is configured to determine a transmission order when transmitting generated traffic request signals to the content provider 150. The terminal 110 determines the transmission order of the non-real-time traffic request signals to be transmitted to the content provider 150 based on an operation or instruction sequence inputted by the user or the priority information based on a type of the contents. Thereafter, the terminal 110 transmits the non-real-time traffic request signal to the content provider 150 based on the determined transmission order.

The terminal 110 receives the policy answer signal corresponding to the policy request signal from the policy provider 140 via the network 120 (S1220). At Step S1220, the policy provider 140 checks the network status in order to generate the policy answer signal, and generates the policy answer signal including at least one of the policy request cycle information according to the network status, the threshold value, or the priority information. The threshold value is information including respective threshold values for a plurality of parameters related to the traffic control. The threshold value is a value that is adaptively set based on at least one piece of information among the number of terminals assigned to the transmitter 210 or 220 in the path network (any one of 122, 124, 126, . . . , and 128), traffic transmission status of each terminal, and transmission request time of each terminal. The threshold value has a value for limiting the number of terminals assigned to each transmitter in the path network (any one of 122, 124, 126, . . . , and 128) within a predetermined range. The priority information has a value that is set to allow the traffic to be transmitted on a priority basis at the most available time or a priority value that is set based on a type of the path network (any one of 122, 124, 126, . . . , and 128). The policy provider 140 periodically transmits such a policy answer signal to the terminal 110.

Upon receiving the policy answer signal from the policy provider 140, the terminal 110 transmits a policy ACK indicating completion of the reception of the policy answer signal to the policy provider 140 via the network 120 (S1230). Thereafter, the terminal 110 transmits the non-real-time traffic request signal to the content provider 150 via the network 120 (S1240). The terminal 110 downloads the non-real-time traffic answer signal corresponding to the non-real-time traffic request signal from the content provider 150 via the network 120 or uploads the contents stored in the terminal 110 to the content provider 150 (S1250). At Step S1250, the terminal 110 is configured to determine the order when transmitting the generated traffic request signal to the content provider 150. The terminal 110 determines the transmission order of the non-real-time traffic request signal to be transmitted to the content provider 150 according to the priority information based on the sequence of the input user's operation or instruction or the type of the contents, and transmits the non-real-time traffic request signal to the content provider 150 based on the determined transmission order.

The terminal 110 detects the network status of the network 120 at the time of the download or the upload (S1260). At Step S1260, the terminal 110 determines whether or not to control the traffic based on the network status of the path network (any one of 122, 124, 126, . . . , and 128) detected at the time of the download or the upload, and controls the download or the upload (traffic) based on the result of the determination. The terminal 110 compares the transmission rate at the time of the download or the upload with the threshold value included in the policy answer signal, when the transmission rate is below the threshold value, detects that the network status is busy, and suspends the download or the upload (traffic). When main quality indexes of Rx and Tx among the parameters related to the traffic control included in the policy answer signal are below the threshold value, the terminal 110 detects that the network status is busy, and suspends the download or the upload (traffic). When a distance between a terminal assigned to the transmitter 210 or 220 in the path network (any one of 122, 124, 126, . . . , and 128) and the transmitter 210 or 220 exceeds a predetermined distance, the terminal 110 suspends the download or the upload (traffic) for a resource efficiency of the path network (any one of 122, 124, 126, . . . , and 128). When a battery level of the terminal is below the threshold value or a temperature of the terminal exceeds the threshold value, the terminal 110 suspends the download or the upload (traffic).

The terminal 110 transmits the policy request signal to the policy provider 140 based on the policy request cycle information included in the policy answer signal (S1270). The terminal 110 receives the policy answer signal corresponding to the policy request signal from the policy provider 140 via the network 120 (S1280). At Step S1280, the policy provider 140 checks the network status in order to generate the policy answer signal, and generates the policy answer signal including at least one of the policy request cycle information according to the network status, the threshold value, or the priority information.

Although it is described that Steps S1210 to S1280 are sequentially performed in FIG. 12, the present disclosure is not limited to this scheme. As the steps in FIG. 12 can be applied in a manner that the steps are appropriately modified or two or more steps are performed in parallel, the steps in FIG. 12 are not limited to the time sequential manner.

Figure 13:
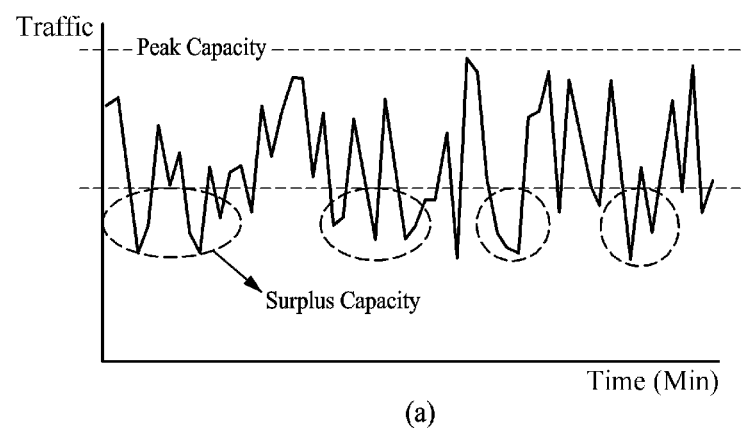
FIG. 13 is a set of graphs for describing non-real-time traffic according to at least one embodiment of the present disclosure.
Figure 13:
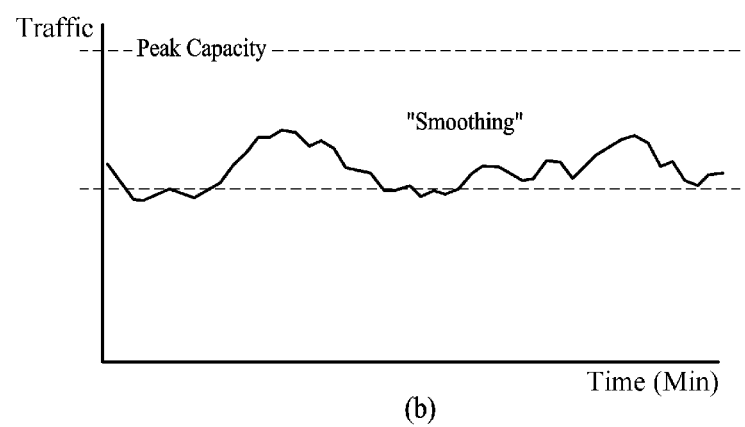

FIG. 13 is a set of graphs for describing the non-real-time traffic according to at least one embodiment of the present disclosure.

The non-real-time traffic according to the first and second embodiments is a technology that is capable of temporarily delaying and transmitting data according to a congestion status of the network 120 in order to make full use of a surplus capacity caused by an instant load change of the network 120. To this end, referring to FIG. 13, as shown in (a) of FIG. 13, the capacity of the network 120 is ensured by introducing facility investment and various solutions in order to respond heavily increasing data traffic. However, due to the high traffic concentration during a busy hour (time of a day with the largest number of calls generated), the investment load for ensuring the capacity is increased, and the utilization of the network 120 is degraded. To cope with this problem, a data transmission service utilizing the surplus capacity of the network 120 shown in (a) of FIG. 13 is provided to control connection and operation scheme of the terminal according to the instant load change of the network 120, so that the load change of the network 120 is maintained as shown in (b) of FIG. 13. The terminal 110 is configured to provide data download or upload at the most optimized time by interlocking with the policy provider 140 and detecting the congestion status of the network 120.

According to some embodiments as described above, the traffic can be adaptively transmitted without affecting the traffic of a network by being transmitted on a non-real-time basis when the usage rate of the network resources is low. Further, according to some embodiments, a temporary network congestion generated by a non-real-time traffic can be controlled by using an idleness capacity while minimizing an investment in the network, thus increasing the network usage. According to some embodiments, the traffic can be adaptively transmitted without affecting the traffic of a network by being transmitted on a non-real-time basis by using overload information when the usage rate of the network resources is low. Further, the traffic can be adaptively controlled on a non-real-time basis in a state in which influence on the network is minimized at a time of a related service operation while reducing unnecessary measurement overhead and time by using transmitter load information previously acquired for transmitter load management. According to some embodiments, the technology supports download and upload of massive contents on a non-real-time basis, which does not affect a network of a network provider, and hence the usage and the efficiency of a network system can be increased by making full use of a network idleness status. Further, according to some embodiments, a new service (for example, an additional service product with a fixed charge applied on the traffic that employs an adaptive traffic transmission method without an additional charge in a measured rate system) can be applied without an additional investment in the network of the network provider. According to some embodiments, a problem of reduced usage rate of the network resources when no user uses a terminal or when the usage of the network is relatively low in the network idleness status, and the network load can be minimized by controlling data transmission that causes a continued busy status during a busy hour.

Although exemplary embodiments of the present disclosure have been described for illustrative purposes, those skilled in the art will appreciate that various modifications, additions and substitutions are possible, without departing the spirit and scope of the claimed invention. Specific terms used in this disclosure and drawings are used for illustrative purposes and not to be considered as limitations of the present disclosure. Therefore, exemplary embodiments of the present disclosure have been described for the sake of brevity and clarity. Accordingly, one of ordinary skill in the art would understand the scope of the claimed invention is not limited by the explicitly described above embodiments but by the claims and equivalents thereof.

What is claimed is:

1. A terminal device as a client which downloads contents from a content provider, comprising:
    a signal generator configured to generate a traffic request signal;
    a policy manager, implemented by one or more processors, configured to
        transmit a policy request signal to a policy provider, and
        receive a policy answer signal corresponding to the policy request signal;
    a traffic transceiver configured to perform a download of a traffic answer signal corresponding to the traffic request signal from the content provider via a path network;
    a terminal network detector, implemented by one or more processors, configured to detect a network status of the path network based on the policy answer signal; and
    a traffic control processor configured, at a time of the download, to
        determine a traffic control status based on the network status, and
        control the download based on the traffic control status,
    wherein
    the policy answer signal includes a signal including at least one piece of information selected from the group consisting of policy request cycle information based on the network status, threshold value, and priority information,
    the threshold value, as information including respective threshold values for a plurality of parameters related to traffic control, includes
        (a) a value to be adaptively set according to at least one piece of information selected from the group consisting of (i) number of terminal devices assigned to a transmitter in the path network, (ii) traffic transmission status of each of the terminal devices, and
(iii) transmission request time of each of the terminal devices, and
(b) a value for limiting the number of terminal devices assigned to each transmitter in the path network within a preset range, and
the priority information includes a value that is set to transmit traffic on a priority basis at a most available time or a value of priority based on a type of the path network.

2. The terminal device of claim 1, wherein the traffic control processor is configured to compare a transmission rate during the download with the threshold value included in the policy answer signal, and when the transmission rate is lower than the threshold value, to detect that the network status is busy and suspend the download.

3. The terminal device of claim 2, wherein the traffic control processor is configured, when main quality indexes of Rx and Tx among parameters related to the traffic control included in the policy answer signal are below the threshold value, to detect that the network status is busy and suspend the download.

4. The terminal device of claim 2, wherein the traffic control processor is configured, when a distance between (i) the terminal device assigned to the transmitter in the path network and (ii) the transmitter exceeds a predetermined distance, to suspend the download in order to enhance a resource efficiency of the path network.

5. The terminal device of claim 1, further comprising:
a policy requester, implemented by one or more processors, configured to transmit the policy request signal to the policy provider based on policy request cycle information included in the policy answer signal; and
a retry processor configured to perform a retry of the download based on the policy answer signal.

6. The terminal device of claim 5, wherein the retry processor is configured to perform the retry of the download under a condition that a preset time of a timer elapses, the path network is switched to other network, or a new traffic network signal is received from the signal generator.

7. A terminal device as a client which downloads contents from a content provider, comprising:
a signal generator configured to generate a traffic request signal;
a policy manager, implemented by one or more processors, configured to
transmit a policy request signal to a policy provider, and
receive a policy answer signal corresponding to the policy request signal;
a traffic transceiver configured to perform a download of a traffic answer signal corresponding to the traffic request signal from the content provider via a path network;
a terminal network detector, implemented by one or more processors, configured to detect a network status of the path network based on the policy answer signal; and
a traffic control processor configured, at a time of the download, to
determine a traffic control status based on the network status, and
control the download based on the traffic control status, wherein
the policy manager is configured to
transmit the policy request signal including network identification information for identifying the path network to the policy provider, and
receive the policy answer signal including overload area information in response to the policy request signal, and
the traffic control processor is configured to control the download based on the overload area information at the time of the download.

8. The terminal device of claim 7, wherein the traffic control processor is configured to check the overload area information, and when a result of the check indicates that the transmitter identification information is included in the overload area information, to suspend the download for a predetermined time.

9. The terminal device of claim 7, wherein the traffic control processor is configured to
check the overload area information, and
when a result of the check indicates that the transmitter identification information is not included in the overload area information,
determine whether or not to control the traffic based on at least one of the network status of the path network detected at the time of the download or the policy answer signal, and
control the download based on a result of the determination.

10. The terminal device of claim 9, wherein the traffic control processor is configured to compare a transmission rate at the time of the download with a threshold value included in the policy answer signal, and when the transmission rate is below the threshold value, to suspend the download.

11. A method performed by a terminal device for adaptively controlling traffic, the terminal device as a client which downloads contents from a content provider, the method comprising:
transmitting a policy request signal to a policy provider;
receiving a policy answer signal in response to the policy request signal;
performing traffic transmission and reception including downloading a traffic answer signal in response to a traffic request signal from the content provider via a path network;
detecting a network status of the path network based on the policy answer signal;
determining whether or not to perform traffic control based on the network status during the downloading; and
controlling the downloading based on a result of the determining,
wherein
the policy answer signal includes a signal including at least one piece of information selected from the group consisting of policy request cycle information based on the network status, the threshold value, and priority information,
the threshold value, as information including respective threshold values for a plurality of parameters related to traffic control, includes
(a) a value to be adaptively set according to at least one piece of information selected from the group consisting of (i) number of terminal devices assigned to a transmitter in the path network, (ii) traffic transmission status of each of the terminal devices, and (iii) transmission request time of each of the terminal devices, and
(b) a value for limiting the number of terminal devices assigned to each transmitter in the path network within a preset range, and the priority information includes a value that is set to transmit traffic on a priority basis at a most available time or a value of priority based on a type of the path network.

12. The method of claim 11, further comprising:
transmitting the policy request signal to the policy provider based on policy request cycle information included in the policy answer signal; and
retrying the downloading based on the policy answer signal.

13. The method of claim 12, wherein the retrying of the downloading is performed under a condition that a preset time of a timer elapses, the path network is switched to other network, or a new traffic network signal is received from a signal generator.

14. The method of claim 11, wherein the detecting of the network status comprising:
comparing a transmission rate during the download with a threshold value included in the policy answer signal, and
when the transmission rate is lower than the threshold value, detecting that the network status is busy, and suspending the download.

15. The method of claim 11, further comprising:
when main quality indexes of Rx and Tx among parameters related to the traffic control included in the policy answer signal are below the threshold value,
detecting that the network status is busy, and suspending the download.

16. The method of claim 11, further comprising:
when a distance between (i) the terminal device assigned to the transmitter in the path network and (ii) the transmitter exceeds a predetermined distance,
suspending the download in order to enhance a resource efficiency of the path network.

17. A server for controlling a policy, the server comprising:
a communicator configured to
communicate with a terminal device via a path network, the terminal device being a client which downloads contents from a content provider, and
receive a policy request signal including network identification information for identifying the path network from the terminal device;
a device interlocker, implemented by one or more processors, configured to receive an overloaded transmitter list from a transmitter load manager;
a network detector, implemented by one or more processors, configured to detect network status of the terminal device assigned to the path network;
a policy determiner, implemented by one or more processors, configured to
perform a function of managing a policy related to data traffic based on the detected network status,
compare the transmitter identification information with the overloaded transmitter list to check whether the terminal device is located in overload area, and
generate a policy answer signal including a policy determined based on a result of the checking, wherein the policy answer signal including overload area information in response to the policy request signal,
wherein
the policy answer signal includes a signal including at least one piece of information selected from the group consisting of policy request cycle information based on the network status, the threshold value, and priority information,
the threshold value, as information including respective threshold values for a plurality of parameters related to traffic control, includes
(a) a value to be adaptively set according to at least one piece of information selected from the group consisting of
(i) number of terminal devices assigned to a transmitter in the path network,
(ii) traffic transmission status of each of the terminal devices, and
(iii) transmission request time of each of the terminal devices, and
(b) a value for limiting the number of terminal devices assigned to each transmitter in the path network within a preset range, and
the priority information includes a value that is set to transmit traffic on a priority basis at a most available time or a value of priority based on a type of the path network.

* * * * *